United States Patent
Akhtar et al.

(10) Patent No.: US 12,150,064 B2
(45) Date of Patent: Nov. 19, 2024

(54) ADAPTIVE ACCESS POINT CONFIGURATION BASED ON AVAILABLE POWER

(71) Applicant: Arista Networks, Inc., Santa Clara, CA (US)

(72) Inventors: Nadeem Akhtar, Navi Mumbai (IN); Preyas Hathi, Pune (IN); Jatin Parekh, Mumbai (IN); Anubhav Gupta, Navi Mumbai (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 287 days.

(21) Appl. No.: 17/591,531

(22) Filed: Feb. 2, 2022

(65) Prior Publication Data

US 2023/0292248 A1 Sep. 14, 2023

(51) Int. Cl.
*H04W 52/02* (2009.01)
*H04B 7/0452* (2017.01)
*H04W 52/36* (2009.01)

(52) U.S. Cl.
CPC ...... *H04W 52/0277* (2013.01); *H04B 7/0452* (2013.01); *H04W 52/0245* (2013.01); *H04W 52/367* (2013.01)

(58) Field of Classification Search
CPC ..... H04W 52/02; H04W 52/14; H04W 52/18; H04W 52/00; H04W 52/0203; H04W 52/0206; H04W 52/0212; H04W 52/0219; H04W 52/0225; H04W 48/08; H04W 48/20; H04W 48/04; H04W 88/02; H04W 88/08; H04W 88/10; H04W 88/085; H04W 88/12; H04W 92/20; H04W 92/18; H04W 92/14; H04W 92/12; H04W 92/00; H04W 76/00; H04W 76/10; H04W 76/11;
(Continued)

(56) References Cited

U.S. PATENT DOCUMENTS 5,410,740 A * 4/1995 Hagstrom ............... 455/67.1
2009/0010190 A1 * 1/2009 Gomg ..................... 370/311
(Continued)

FOREIGN PATENT DOCUMENTS

EP 2805215 B1 * 3/2018 ............ G06F 1/26
WO WO 9721294 A2 * 6/1997 ............ H04J 13/00

OTHER PUBLICATIONS

BR 112016026609 B1) >>> Techniques for Managing the Energy Consumption of a Mobile Device (see title) (Year: 2023).*
(Continued)

*Primary Examiner* — Meless N Zewdu
(74) *Attorney, Agent, or Firm* — Fountainhead Law Group, PC

(57) ABSTRACT

Methods, systems and devices for controlling an operating configuration of a network device such as a wireless access point include detecting power supplied to the access point. Operating parameters of the access point, neighboring access points, and client devices wirelessly connected to the access point are determined. The access point is placed in a reduced-capability operating configuration in response to detecting the power supplied is less than a power threshold. The reduced-capability operating configuration is based on the determined operating parameters of the access point, neighboring access points, and client devices.

20 Claims, 19 Drawing Sheets

(58) Field of Classification Search
CPC ..... H04W 76/15; H04W 76/18; H04W 72/29; H04W 72/27; H04W 72/044; H04W 56/0025; H04W 48/00; H04W 48/002; H04W 40/20; H04W 40/22; H04W 40/38; H04W 52/30; H04W 52/34; H04W 64/00; H04W 4/12; H04W 4/029; H04W 8/02; H04W 8/22; G01S 5/00; G01S 5/0036; G01S 19/09
See application file for complete search history.

(56) References Cited

U.S. PATENT DOCUMENTS

| | | | |
|---|---|---|---|
| 2009/0240962 A1* | 9/2009 | Keenly et al. | 713/310 |
| 2012/0051260 A1* | 3/2012 | Tamaki | 370/253 |
| 2015/0036488 A1* | 2/2015 | Mettu et al. | H04W 28/0289 |
| 2015/0346807 A1* | 12/2015 | Homchaudhuri et al. | G06F 1/3293 |
| 2019/0028970 A1* | 1/2019 | Wang | H04W 52/0235 |
| 2021/0341985 A1* | 11/2021 | Naguvanahalli et al. | G06F 1/3209 |
| 2022/0201708 A1* | 6/2022 | Reuche | H04W 72/1257 |
| 2022/0256474 A1* | 8/2022 | Myron et al. | H04W 52/223 |

OTHER PUBLICATIONS

CN 105122906 A) >>> Telecommunication Device And Method (see title) (Year: 2015).*
WO 2009118905 A1) >>> Mobile Terminal Device and Method for Controlling Power Saving of the Same (see title) (Year: 2009).*
WO 2017113293 A1) >>> Communication Device, and Method and Apparatus for Reducing Power Consumption of Communication Device (title) (Year: 2017).*
JP 2014116850 A) >>> Access Point Device, Control Method for Access Point Device, and Radio Communication System (see title). (Year: 2014).*
CN 204465880 U) >>> A Wireless Network Access System (see title) (Year: 2015).*
CN 106341900 A) >>> An Auxiliary Communication Device And Method, Wireless Access Point And Its Method (see title). (Year: 2017).*
Xing, Jin-qiang (CN 112789900 A) >>> Power Supply Control Method And Device (see title) (Year: 2021).*
Hung et al. (CN 102217165 A) >>> Communication Power Supply And Control Method Thereof (see title) (Year: 2011).*
International Searching Authority, International Search Report and Written Opinion, PCT/US2023/060671, dated May 17, 2023, 34 pgs.

* cited by examiner

| Controlled Operating Parameter | Detected Operating Parameters | AP Configuration Change |
|---|---|---|
| Transmitter (Tx) Power | Current Tx power, received signal strength indicators (RSSIs), and neighboring APs | Control peak transmission power of the AP |
| Transmitter (Tx)/ Receiver (Rx) Chains | Channel utilization, channel bandwidth, MU-MIMO clients, SU-MIMO clients, neighboring APs, client and AP Tx buffer storage, AP wired interface characteristics | Control number of activated and deactivated Tx/Rx chains of the AP |
| Bluetooth (BLE) | Number of BLE clients connected to the AP | Adjust the rate of BLE beacons transmitted by the AP |
| Universal Serial Bus (USB) Port | USB device connected to AP and type of USB device | Power OFF/ON the USB port of the AP |
| Dual-Band Radio (5 GHz and 2.4 GHz) | Number of client devices connected to AP on 5 GHz and 2.4 GHz frequency bands | Control number of activated and deactivated 5 GHz and 2.4 GHz transceivers |

*Figure 3*

ADAPTIVE ACCESS POINT CONFIGURATION BASED ON AVAILABLE POWER

BACKGROUND

The present disclosure relates generally to wireless communications and, more particularly, to adapting the configuration of a wireless access point (AP) to accommodate a current state of a network including the access point.

A wireless access point (AP) commonly receives power through a Power over Ethernet (PoE) port of another network device, such as a network switch. A wireless AP communicates wirelessly with client devices connected to the AP through a corresponding wireless protocol, such as one of the IEEE 802.11 standards for implementing wireless local area networks (WLAN), 4G cellular protocols, 5G cellular protocols, or other types of wireless communications protocols. The power available to the AP is limited by the power available from the PoE port, which is a port that supplies power at a level according to one of the PoE standards IEEE 802.3af (original PoE), IEEE 802.3at (PoE+), and IEEE 802.3bt (PoE++). The level of power available from the PoE port may vary over time, being higher at some times and lower at other times during operation of the AP. As a result, the available power to the AP may vary over time. Existing APs deal with these variations in available power by setting the AP to one of two operating modes or configurations: 1) a full-capabilities (FC) operating mode configuration; and 2) a reduced-capabilities (RC) operating mode or configuration. When the power from the PoE port is above a specified power threshold, the AP operates in the FC mode and all features and capabilities of the AP are operational. Conversely, when the power from the PoE port drops below the power threshold, the AP is placed into the RC mode and operates with a predetermined subset of the full features of the FC mode being enabled. In addition to operating in the RC mode, some existing APs, which are commonly referred to as "Green APs," may also enter a low power mode of operation when the AP determines that no client devices are currently wirelessly connected to the AP.

Setting the AP to the RC mode reduces the power consumption of the AP to accommodate or adapt to the lower available power being supplied to the AP via the PoE port. While this conventional approach does reduce power consumption of the AP to accommodate the lower power being supplied, the performance of client devices wirelessly connected to the AP may be adversely affected in the RC mode. For example, coverage provided by the AP for client devices may be reduced, resulting in some client devices losing wireless connection with the AP. Here "coverage" corresponds to a zone or region around the AP in which there is sufficient signal strength for a client device to wirelessly connect to the AP. In the RC mode, the throughput of client devices wirelessly connected to the AP may also be reduced, which may adversely affect the quality of service and thus the experiences of users of those client devices.

There is a need for improved techniques of controlling operation of a wireless AP, or other electronic device communicating according to one of the IEEE 802.11 standards, in a reduced-capabilities mode of operation.

BRIEF DESCRIPTION OF THE DRAWINGS

In the following discussion generally and in particular in relation to the drawings, the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 3 is a table illustrating operating parameters of the wireless access point that are detected and controlled by the ACC module of FIG. 2 according to embodiments of the present disclosure.

DETAILED DESCRIPTION

Described herein are systems, methods, and devices, such as network devices like a wireless access point (AP), for adaptively controlling an operating configuration of a wireless access point (AP) or other network device when operating in a reduced-capabilities (RC) mode due to a reduced level of power being available to power the wireless AP or other network device. When power being supplied to the wireless AP from a PoE port or other power source is above a specified power threshold, the wireless AP operates in a full-capabilities (FC) mode and all features and capabilities of the AP are operational. Conversely, when power from the PoE port drops below the power threshold, the AP is placed into the RC mode having an adaptively controlled or dynamic operating configuration that is based on operating parameters of a network including the wireless AP. These operating parameters include operating parameters of the wireless AP, operating parameters of neighboring APs, and operating parameters of client devices wirelessly connected to the AP, as will be described in more detail below.

In embodiments of the present disclosure, instead of a wireless AP being configured with a predetermined or hard-coded operating configuration in the RC mode, the wireless AP is configured or placed in an RC operating configuration that is adaptively configured to both reduce power consumption of the wireless AP and at the same time maintain coverage and throughput requirements of client devices connected to the wireless AP. The wireless AP determines the operating parameters of the wireless AP along with the number and characteristics of neighboring APs and the client devices connected to the AP. The wireless AP then utilizes these determined operating parameters to update or adaptively control the operating configuration of the AP when operating in the RC mode. In this way, the operating configuration of the wireless AP is adapted to suit the current state of the network including the AP, neighboring APs, and client devices. This improves or maintains the performance of the client devices even when the AP is operating at the reduced power level in the RC mode.

Figure 1:
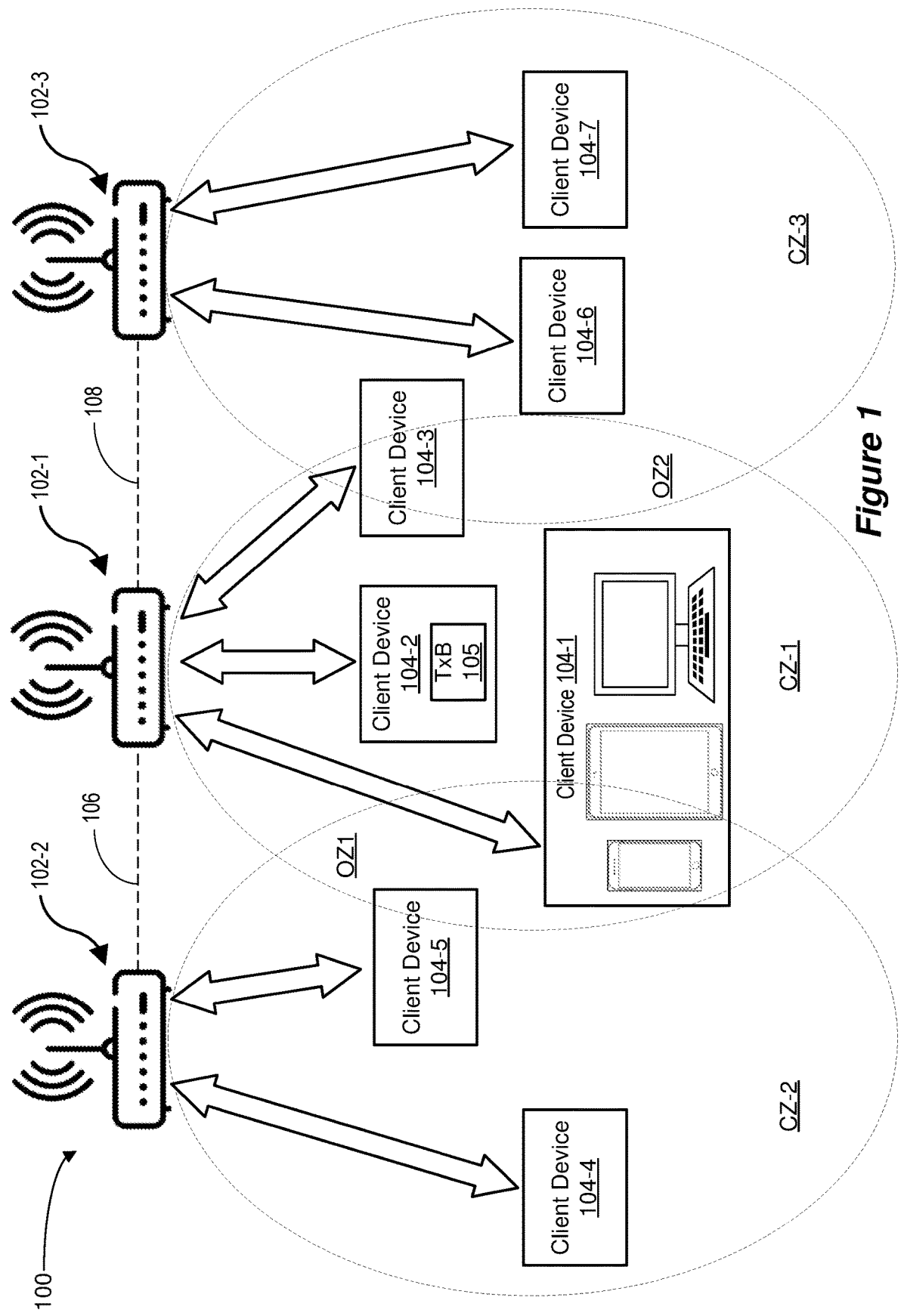
FIG. 1 illustrates an example environment in which a wireless access point or other network device communicates with client devices and neighboring wireless access points to adaptively control the operating configuration of the wireless access point according to embodiments of the present disclosure.

FIG. 1 illustrates an example environment 100 in which a wireless access point (AP) 102-1 adaptively controls an operating configuration of the wireless AP according to embodiments of the present disclosure. In operation, the AP 102-1 determines operating parameters of the AP and also wirelessly communicates with client devices 104-1, 104-2, 104-3 to determine operating parameters of these client devices and communicates with the neighboring wireless APs 102-2, 102-3 to determine operating parameters of these neighboring APs. When operating in an RC mode due to a reduced level of power being available to power the wireless AP, the wireless AP 102-1 utilizes these determined operating parameters to adaptively control an operating configuration of the wireless AP, as will be described in more detail below. When operating in the FC mode, namely when full or maximum power is being supplied to the AP 102-1, all features and capabilities of the AP are operational and the operating configuration need not be adaptively controlled. Each wireless AP 102-1, 102-2, 102-3 transmits and receives data over a wireless local area network (WLAN) and functions as the interconnection point between the WLAN and a wired network (not shown in FIG. 1), as will be understood by those skilled in the art.

In the present description, a hyphenated form of a reference numeral is used to refer to a specific instance of a component or element while the un-hyphenated form of the reference numeral refers to the elements collectively or to a generic one of the elements. Thus, for example, the wireless AP 102-1 refers to a particular one of the group of wireless APs 102-1, 102-2, and 102-3, which may be referred to collectively as wireless APs 102 and any one of which may be referred to generically as an AP 102. Furthermore, in the present description APs communicating through one of the IEEE 802.11 standards are described in more detail as an example of embodiments of the present disclosure. As mentioned above, however, embodiments of the present disclosure include APs communicating through other wireless or cellular protocols such as 4G and 5G protocols.

Referring still to FIG. 1, the particular operating parameters that the AP 102-1 utilizes to adaptively control its operating configuration may vary in different embodiments of the present disclosure. The operating configuration of the AP 102-1 corresponds to the collective settings of the operating parameters of the AP which may be adjusted or controlled during operation. For example, the wireless AP 102-1 may include multiple antenna chains (i.e., transmit (Tx)/receive (Rx) chains) and may include advanced features like multi-user multiple-input and multiple-output antennas (MU-MIMO) and multi-band-radios or multi-band-transceivers at frequency bands 2.4 GHz, 5 GHz and 6 GHz, for example. All of these features of the AP 102-1 have associated operational parameters that may be adaptively controlled during operation in the RC mode to thereby adaptively control the operating configuration of the AP according to embodiments of the present disclosure. The operational parameters of the AP 102-1 along with those of the neighboring APs 102-2, 102-3 and those of the client devices 104-1, 104-2, 104-3 that are utilized in embodiments of the present disclosure will be described in more detail below with reference to FIGS. 3-16.

In the environment 100, neighboring APs 102-2, 102-3 are those APs proximate the AP 102-1 that is adaptively controlling its operating configuration. The neighboring APs 102-2, 102-3 are "proximate" the AP 102-1 in terms of the strength or power level of the radio frequency (RF) or wireless signals transmitted by these neighboring APs and received by the AP 102-1. An AP that transmits a wireless signal which is received by the AP 102-1 at a signal strength above a signal threshold is a neighboring AP of the AP 102-1. In the example of FIG. 1, the APs 102-2 and 102-3 are neighboring APs of the AP 102-1. Each of the APs 102 may be adaptively controlling its operating configuration in embodiments of the present disclosure, but in the example environment 100 of FIG. 1 only the AP 102-1 is described as adaptively controlling its operating configuration. As seen in FIG. 1, each of the wireless APs 102-1, 102-2, 102-3 has a corresponding coverage zone CZ1, CZ2, CZ3. Each coverage zone CZ1, CZ2, CZ3 corresponds to the region or zone around the corresponding wireless AP in which there is sufficient signal strength of signals being communicated between the AP and a client device 104 for the client device to wirelessly connect to the AP. The client devices 104-1, 104-2 and 104-3 are within the coverage zone CZ1 of the wireless AP 102-1. Each of these client devices 104-1, 104-2 and 104-3 is wirelessly connected to the AP 102-1. The client devices 104-4 and 104-5 are similarly within the coverage zone CZ2 and are wirelessly connected to the neighboring wireless AP 102-2 while client devices 104-6 and 104-7 are within coverage zone CZ3 and are wirelessly connected to the neighboring wireless AP 102-3.

FIG. 1 illustrates that the coverage zones CZ of neighboring APs 102 may overlap. In FIG. 1 an overlap zone OZ1 is present between coverage zones CZ1 and CZ2 while an overlap zone OZ2 is present between coverage zones CZ1 and CZ3. Thus, when in these overlap zones OZ1, OZ2 a client device 104 may be capable of connecting alternatively to either of the corresponding wireless APs 102. For example, a client device in the OZ1 may connect to either the wireless AP 102-1 or the AP 102-2. The wireless AP 102-1 may utilize this information regarding overlapping coverage zones CZ in adaptively controlling the operating configuration of the AP, as will be described in more detail below with some of the embodiments of FIGS. 3-16. For example, if the client device 104-3 was the only client device connected to the wireless AP 102-1, then the wireless AP 102-1 may reduce its transmit power or deactivate radios operating in the frequency band through which the client device is connected to the AP. This is true because if the client device 104-3 is disconnected from the AP 102-1 the client device may thereafter connect to the neighboring AP 102-3 since the client device is present in the overlap zone OZ2 of the coverage zones CZ1, CZ3 of the wireless AP 102-1, 102-3.

The APs 102 in the environment 100 of FIG. 1 may optionally be interconnected through wired communications links. In the example of FIG. 1, the wireless AP 102-1 is coupled to wireless AP 102-2 through a first wired communications link 106 and wireless AP 102-1 is coupled to wireless AP 102-3 through a second wired communications link 108. These wired communications links 106, 108 may, for example, be Ethernet links. The AP 102-1 utilizes these communication links 106, 108 to obtain operating states of the neighboring APs 102-2 and 102-3 for use in adaptively controlling the operating configuration of the AP 102-1. The operating state of each neighboring AP 102-2, 102-3 includes information regarding the current operating configuration of the neighboring AP, where the current operating configuration of the neighboring AP is based on the current operating parameters of its neighboring APs. Each of the client devices 104 may be any type of electronic device having wireless connectivity to connect to the APs 102. This includes smart phones, tablet computers, and laptop or desktop computers as illustrated for the client device 104-1 in FIG. 1. In addition, each client device 104 would typically include a transmit buffer (TxB), which is illustrated only for the client device 104-2 in FIG. 1. The TxB 105 is a queue that stores data to be wirelessly communicated to the AP 102. Embodiments of the present disclosure may utilize characteristics of the contents of the TxB 105 of the client devices 104 in adaptively controlling the operating configuration of the AP 102-1, as will be described in more detail below.

Figure 2:
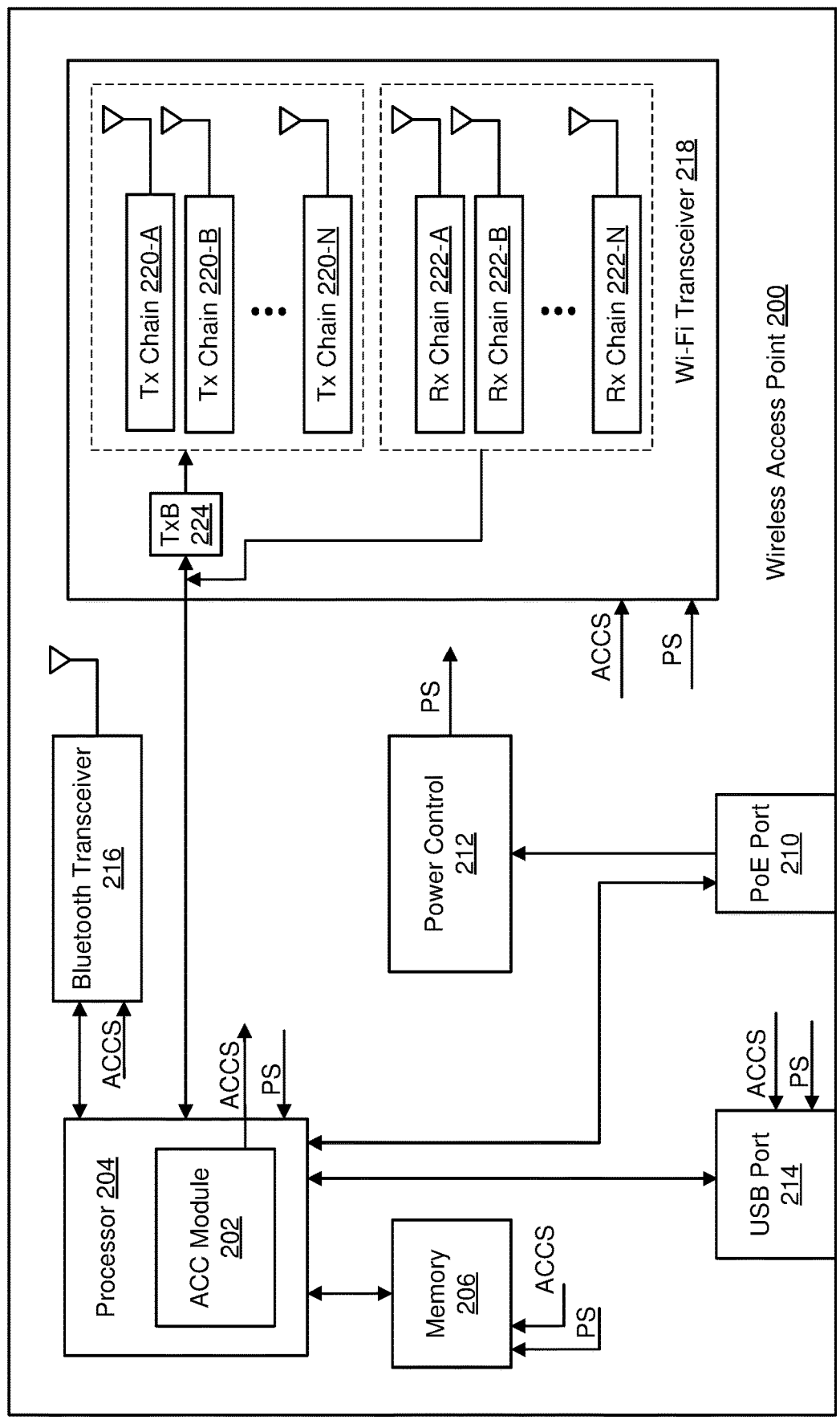
FIG. 2 is a functional block diagram of a wireless access point including an adaptive configuration control (ACC) module that controls or adapts the operating configuration of the wireless access point according to embodiments of the present disclosure.

FIG. 2 is a functional block diagram of a wireless AP 200 including an adaptive configuration control (ACC) module 202 that adaptively controls the operating configuration of the wireless AP according to embodiments of the present disclosure. The ACC module 202 executes on a processor 204 of the wireless AP 200 in the embodiment of FIG. 2 and operates to place the AP in the RC mode in response to detecting power being supplied to the AP dropping below a power threshold. In operation, the ACC module 202 generates adaptive configuration control signals ACCS that are supplied to components of the AP to adaptively control the operating configuration of the AP during operation in the RC mode. The processor 204 communicates with a memory 206 which stores encoded instructions that cause the processor to control the overall operation of the AP 200 and the ACC module 202 to perform operations described herein for adaptively controlling the operating configuration of the AP when operating in the RC mode.

The wireless AP 200 includes a power over Ethernet (PoE) port 210 that provides a wired communications link to the AP and also receives electrical power that is utilized to power the AP. Power control circuitry 212 in the AP 200 receives electrical power supplied through the PoE port 210 and utilizes this electrical power to supply power to components in the AP. This electrical power supplied by the power control circuitry 212 to components in the AP 200 is represented as power signals PS in FIG. 2. As mentioned above, the amount of electrical power supplied through the PoE port 210 may vary during operation of the AP 200, and may be less than a rated or maximum power of the AP. The AP 200 operates in the FC mode when the rated or maximum power is supplied through the PoE 210 to power the AP. In the FC mode all features and capabilities of the AP 200 are operational and the ACC module 202 need not actively control the operating configuration of the AP. In contrast, when the power supplied through the PoE port 210 drops below a power threshold that is less than the rated or maximum power, the ACC module 202 places the AP 200 into the RC mode and actively controls the operating configuration of the AP. This control is represented in FIG. 2 as active configuration control signals ACCS that are generated by the ACC module 202 and which are applied to control the operation of components of the AP 200 and in this way adaptively control the operating configuration of the AP during operation in the RC mode.

In embodiments, the ACC module 202 detects whether the power supplied through the PoE port 210 drops below the power threshold for a step-down time threshold. In response to detecting the power being supplied to the PoE port 210 dropping below the power threshold for the step-down time threshold, the ACC module 202 places the AP 200 into the RC mode of operation. The power available to the AP 200 is limited by the power available from the PoE port 210, which is a port that supplies power at a level according to one of the PoE standards IEEE 802.3af (original PoE), IEEE 802.3at (PoE+), and IEEE 802.3bt (PoE++).

The wireless AP 200 further includes a universal serial bus (USB) port 214 as illustrated in FIG. 2 to enable USB devices to be coupled to the AP. In controlling the operating configuration of the AP 200, the ACC module 202 may control activation and deactivation of the USB port 214 as part of adaptively controlling the operating configuration of the AP. In this way, the ACC module 202 may deactivate the USB port 214 during operation in the RC mode to lower power consumption of the wireless AP 200. Whether to deactivate the USB port 214 may be based on the type of USB device connected to the USB port, as will be described in more detail below.

In the embodiment of FIG. 2, the wireless AP 200 includes a Bluetooth transceiver 216 that allows the AP to connect to and communicate with client devices 104 through the Bluetooth wireless standard. The wireless AP 200 also includes one or more Wi-Fi transceiver 218 that allows the AP to connect to and communicate with client devices 104 through the IEEE 802.11 wireless standard. The Wi-Fi transceiver 218 includes a plurality of transmitter (Tx) chains 220-A to 220-N and a plurality of receiver (Rx) chains 222-A to 222-N. Each Tx chain corresponds to electronic components of a wireless transmitter associated with a particular antenna to transmit wireless signals. Similarly, each Rx chain corresponds to electronic components of a wireless receiver associated with a particular antenna to receive wireless signals.

These multiple Tx chains 220 and Rx chains 222 are utilized providing advanced communication features of the wireless AP like MU-MIMO functionality and orthogonal frequency division multiple access (OFDMA) functionality, as will be understood by those skilled in the art. During operation in the RC mode, the ACC module 202 controls activation and deactivation of the Tx chains 220 along with transmission power of the Tx chains to manage power consumption of the wireless AP 200 and coverage of client devices connected to the AP. The ACC module 202 similarly controls activation and deactivation of the Rx chains 222 to manage power consumption and coverage of client devices connected to the AP 200. This operation of the ACC module 202 in controlling activation and deactivation and transmit power of the Tx chains and activation and deactivation of the Rx chains is described in more detail below. Although only a single processor 204, PoE port 210 and USB port 214 are shown in the embodiment of FIG. 2, the AP 200 may include more than one of each of these components in further embodiments.

The AP 200 further includes a transmit buffer (TxB) 224 that receives from the processor 204 data to be transmitted wirelessly to client devices (not shown in FIG. 2). This data to be transmitted is queued in the TxB 224 and is thereafter supplied to the Tx chains 220 for transmission to the client devices. Embodiments of the ACC module 202 may utilize characteristics of the contents of the TxB 224 of the AP 200 in adaptively controlling the operating configuration of the AP, as will be described in more detail below. The AP 200 may include multiple transmit buffers 224, each transmit buffer being associated with one or more transceiver 218, as will be appreciated by those skilled in the art. Only one Tx buffer 224 is shown in FIG. 2 merely by way of example and to simplify the figure.

FIG. 3 is a table illustrating operating parameters of the wireless AP 200 that are detected and adaptively controlled by the ACC module 202 of FIG. 2 according to embodiments of the present disclosure. The operation of the ACC module 202 according to the embodiment of FIG. 3 will now be described in more detail with reference to FIGS. 1-3.

Thus, in this description the wireless AP 102-1 of FIG. 1 corresponds to wireless AP 200 of FIG. 2. The table of FIG. 3 classifies the controlled operating parameters of the AP 200 generally into five categories as shown in the leftmost column of the table. The middle column of the table illustrates a set of detected operating parameters, one or more of which may be detected by the ACC module 202 during operation of the AP 200. The rightmost column in the table illustrates the configuration changes the ACC module 202 makes to the controlled operating parameters of the AP 200 based on one or more of the detected operating parameters. The list of parameters in the detected operating parameters column is a list of example. For instance, the ACC module 202 may sense or detect one or more of the detected operating parameters and change an AP configuration based on a portion or all of the detected operating parameters. The configuration changes are described in more detail. Thus, in the table of FIG. 3 each row indicates a controlled operating parameter in the leftmost column of the row, a corresponding set of possible detected operating parameters in the middle column of the row, and adaptive configuration changes to the AP 200 in the rightmost column of the row.

As seen in the first row of the table of FIG. 3 the first controlled operating parameter is transmitter (Tx) power of the Tx chains 220. The ACC module 202 senses or detects one or more of the detected operating parameters listed in the middle column of the first row and utilizes a portion or all of these detected operating parameters in controlling the Tx power of the Tx chains (i.e., in adjusting the controlled operating parameter Tx power). The ACC module 202 changes or adaptively controls the operating configuration of the AP 200 by controlling the peak Tx power of the Tx chains 220 as seen in the third column of the first row in the table. In the example embodiment of FIG. 3, the detected operating parameters utilized by the ACC module 202 in adjusting the peak Tx power of AP 200 include the current Tx power of the Tx chains 220 of the AP, the number of neighboring APs, and the received signal strength indicator (RSSI) of each client device 104 connected to the AP. The RSSI is a parameter measured by each client device 104 indicating the strength of the wireless signal received from the AP 200. The wireless AP 200 communicates with each client device 104 connected to the AP to obtain the RSSI of the client device, as will be understood by those skilled in the art. More specifically, these measurements of the RSSI of each client device 104 may be done by AP 200 using transmissions received from the client device. In addition, through features of the IEEE 802.11 standard, the AP 200 may also query each client device 104 to determine the RSSI of transmissions from the AP as seen or detected by the client device, as well as the RSSI detected by the client device for transmissions from neighboring APs. The ACC module 202 utilizes the RSSIs of the client devices 104 connected to the wireless AP along with the current Tx power of the Tx chains 220 and the number of neighboring APs to adaptively control the peak Tx power of the Tx chains. The specific utilization of these detected operating parameters in adaptively controlling the peak Tx power of the AP 200 will be described in more detail below.

The second row of the table of FIG. 3 illustrates the second controlled operating parameter is the number of active Tx chains 220 and Rx chains 222 in the AP 200. The ACC module 202 detects one or more of the detected operating parameters listed in the middle column of the second row and utilizes a portion or all of these detected operating parameters in controlling the number of activated Tx chains 220 and Rx chains 222. The ACC module 202 changes or adaptively controls the operating configuration of the AP 200 by controlling the number of active Tx chains 222 and Rx chains 222 as seen in the third column of the second row in the table. The ACC module 202 detects a number of detected operating parameters for use in controlling activation and deactivation of the Tx chains 220 and Rx chains 222 as seen in the middle column of row two of the table. These detected operating parameters include the utilization of channels over which the AP 200 communicates with or is connected to client devices 104. As will be understood by those skilled in the art, client devices 104 may connect to the wireless AP 200 over different channels of the frequency band (e.g., 5 GHz or 2.4 GHz), where each channel corresponds to a subrange of frequencies within this frequency band. The AP 200 utilizes one of the different channels at a time to communicate with the client devices 104. The utilization of a given channel indicates how much traffic (i.e., frames or packets being communicated over the channel) the AP 200 detects on the channel over a given period of time.

In addition to channel utilization, the other detected operating parameters that are detected by the ACC module 202 include the bandwidths of channels over which the AP 200 is connected to client devices 104, number of neighboring APs, number of MU-MIMO client devices connected to the AP and number of single-user multiple-input and multiple-output (SU-MIMO) client devices connected to the AP. As will be understood by those skilled in the art, SU-MIMO is an older technology in which multiple spatial streams of data are sent or received between the AP 200 and one client device 104 at a time, while MU-MIMO enables simultaneous transmission and reception of data between the AP 200 and multiple client devices. Finally, the ACC module 202 detects, as detected operating parameters, the amount of data stored in the transmit buffer TxB 224 of the AP 200 and the amount of data stored in the transmit buffers of client devices connected to the AP. The specific utilization of these detected operating parameters in adaptively controlling the number of active Tx chains 220 and Rx chains 222 in the AP 200 will be described in more detail below.

The third row of the table of FIG. 3 illustrates the third controlled operating parameter is the Bluetooth functionality of the wireless AP 200. The ACC module 202 detects the number of Bluetooth client devices that are connected to the AP 200 as the detected operating parameters, as seen in the middle column of the third row in the table. The ACC module 202 utilizes the detected number of Bluetooth client devices in controlling the rate at which the AP 200 transmits, via the Bluetooth transceiver 216, Bluetooth beacons to detect Bluetooth client devices within the coverage zone CZ of the AP. The specific utilization of these detected operating parameters in adaptively controlling the rate of Bluetooth beacons transmitted by the AP 200 will be described in more detail below.

The fourth row of the table of FIG. 3 illustrates the fourth controlled operating parameter controlled by the ACC module 222 is USB port 214 of the AP 200. The ACC module 202 detects, as the detected operating parameters, whether a USB device is connected to the USB port 214 and, if a device is connected, the type of USB device. This is shown in the middle column in the fourth row of the table. The ACC module 202 adaptively controls the operating configuration of the AP 200 by deactivating the USB port 214 (i.e., turning OFF power to the port) to reduce power consumption of the AP. The USB port 214 is only deactivated, however, if the type of USB device connected to the USB port allows deactivation. For example, if USB device connected to the USB port 214 is a storage device, then the USB port may be deactivated. In contrast, if the USB device is a network communications type device such as a cellular modem, then the USB port 214 may not be deactivated to maintain the functionality of this USB device. Embodiments directed to this functionality of the ACC module 202 in adaptively controlling the operating configuration of the AP 200 will be described in more detail below.

The fifth row of the table of FIG. 3 illustrates the fourth controlled operating parameters controlled by the ACC module 222 is operation of multi-band radios or transceivers of the AP 200. In the example embodiment of FIG. 3, the radios are dual-band radios where some of the Tx chains 220 are 5 GHz chains while others are 2.4 GHz chains, and the same is true for the Rx chains 222. Embodiments of the present disclosure are not, however, limited to APs including dual-band radios and in further embodiments the AP includes multi-band radios of more than two bands, such as tri-band radios or transceivers where some of the Tx and Rx chains 220, 220 are 2.4 GHz chains, some are 5 GHz chains, and some are 6 GHz chains. A dual-band client device is a client device having radios or transceivers that operate in both the 2.4 GHz and 5 GHz frequency bands, for example. The ACC module 202 detects, as the detected operating parameters, the number of client devices connected to the AP 200 on the 5 GHz frequency band and the number of client devices connected to the AP on the 2.4 GHz band, for example. This is shown in the middle column in the fifth row of the table. The ACC module 202 adaptively controls the operating configuration of the AP 200 by deactivating and activating 5 GHz Tx chains 220 and Rx chains 222, along with 2.4 GHz Tx chains and Rx chains, based on the client devices connected to the AP 200 in each of these frequency bands. This adaptive control is seen in the rightmost column of the fifth row in the table. The specific utilization of these detected operating parameters in adaptively controlling the active 2.4 GHz and 5 GHz Tx chains 220 and Rx chains 222 in the AP 200 will be described in more detail below. In other embodiments, the ACC module 202 may detect the number of multi-band radios connected to the AP on any variation of frequency bands.

Figure 4:
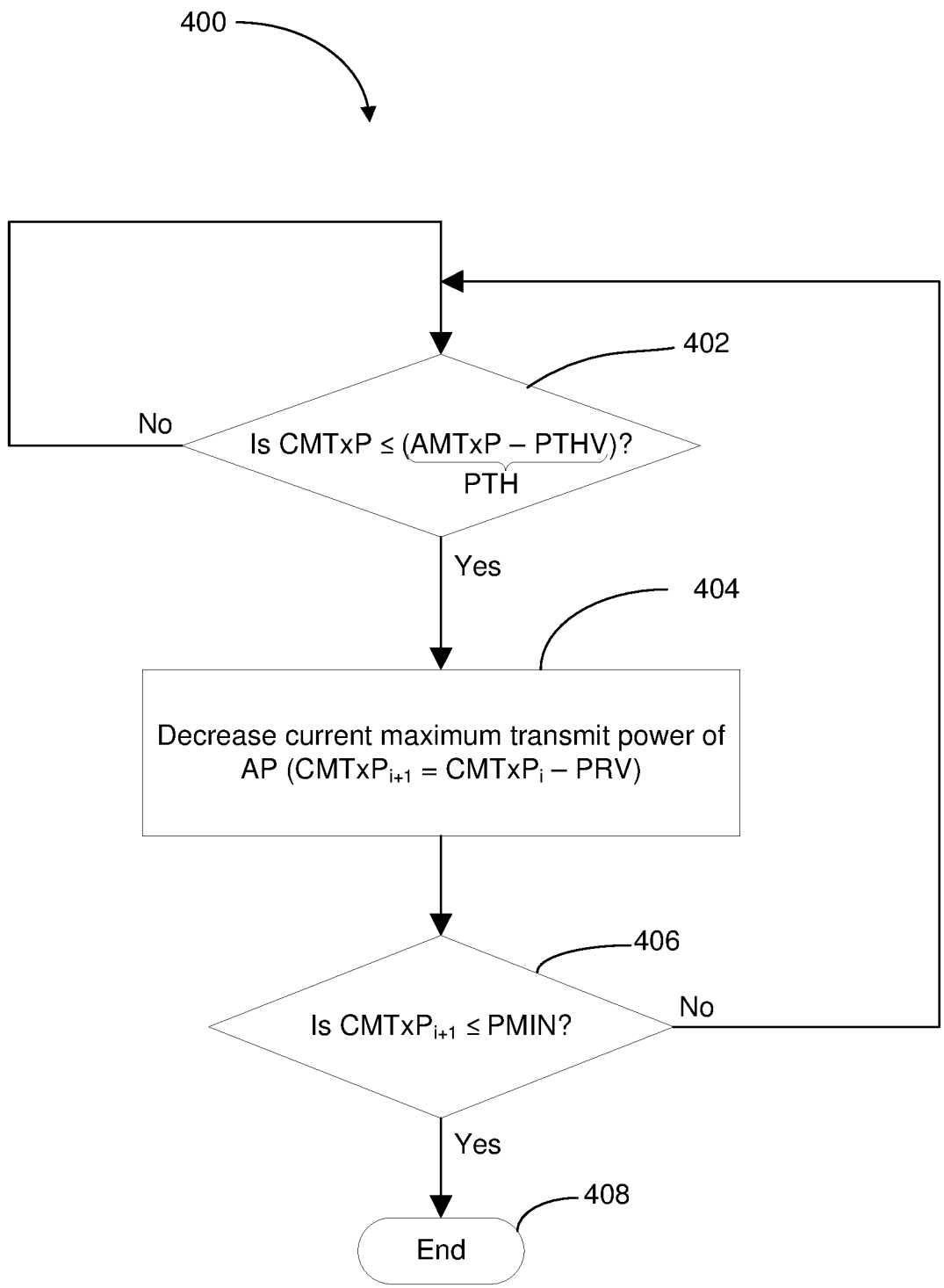
FIG. 4 illustrates a method implemented by the ACC module of FIG. 2 to adaptively control the transmit power of a wireless access point according to embodiments of the present disclosure.

FIGS. 4-16 illustrate methods implemented by the ACC module 202 in adaptively controlling the operating configuration of the AP 200 during operation in the RC mode according to embodiments of the present disclosure. Referring to FIG. 4, the figure illustrates a method 400 implemented by the ACC module 202 of FIG. 2 to adaptively control a current maximum transmit power CMTxP that may be utilized by the wireless AP 200 when transmitting wireless signals according to embodiments of the present disclosure. The method 400 reduces the current maximum transmit power CMTxP of the AP 200 incrementally when this current maximum transmit power is already significantly below (e.g., based on a power threshold value) an absolute maximum transmit power AMTxP of the AP. The rationale for adaptively controlling the operating configuration of the AP 200 in this way is that if the coverage of the AP is adequate at the current maximum transmit power CMTxP, which is already much less than the absolute maximum transmit power AMTxP, then lowering the current maximum transmit power further to reduce power consumption of the AP will not significantly impact the coverage of the AP. At 402, the method 400 determines whether the current maximum transmit power CMTxP of the Tx chains 220 of the AP 200 are less than a power threshold PTH based on the absolute maximum transmit power AMTxP of the Tx chains. The power threshold PTH is equal to the absolute maximum transmit power AMTxP minus a power threshold value PTHV (PTH=AMTxP−PTHV). The power threshold value PTHV may, for example, be 6 dB, and if so then the current maximum transmit power CMTxP is compared to (AMTxP−6 dB) at 402.

When the determination at 402 is negative, the method 400 returns to 402 and continues checking whether the current maximum transmit power CMTxP is less than or equal to the power threshold PTH. When the determination at 402 is positive, the method 400 at 404 incrementally decreases the current maximum transmit power CMTxP of the AP 200 by a power reduction value PRV. The new current maximum transmit power is designated as $CMTxP+_{i+1}$ and is calculated by reducing the existing current maximum transmit power, which is designated as $CMTxP_i$, by the power reduction value PRV ($CMTxP_{i+1}=CMTxP_i-PRV$). At 406, the method 400 thereafter determines whether this new current maximum transmit power $CMTxP+_{i+1}$ is less than or equal to a minimum transmit power PMIN. If the determination at 406 is positive the method at 408 ends and no further reductions in the current maximum transmit power $CMTxP_{i+1}$ of the AP 200 are made. If the determination at 406 is negative the method 400 returns to 402 and again determines whether the current maximum transmit power $CMTxP_{i+1}$ of the AP 200 is less than or equal to the power threshold PTH. In this way the method 400 incrementally decreases the current maximum transmit power $CMTxP_{i+1}$ to reduce power consumption of the AP 200 during operation in the RC mode while coverage of client devices connected to the AP is maintained.

Figure 5:
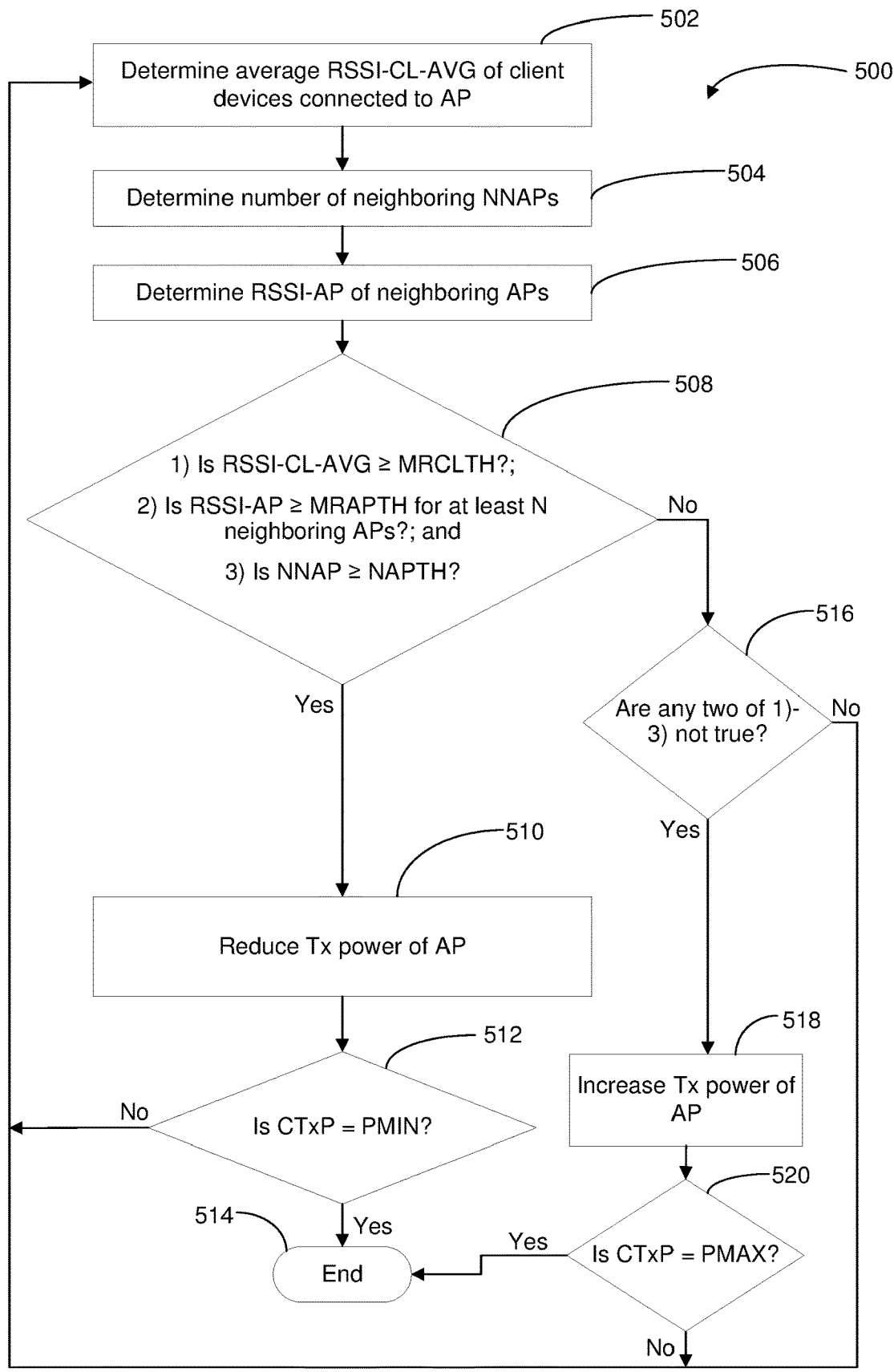
FIG. 5 illustrates another method implemented by the ACC module of FIG. 2 to adaptively control the transmit power of a wireless access point according to embodiments of the present disclosure.

FIG. 5 illustrates a method 500 implemented by the ACC module 202 of FIG. 2 to adaptively control the transmit power of the wireless AP according to embodiments of the present disclosure. At 502, the method 500 determines the average RSSI of client devices connected to the AP 200, with this average designated as RSSI-CL-AVG. Next at 504 the method 500 determines the number of neighboring APs, which is designated NNAP. At 506 the method 500 determines the RSSI of each of these neighboring APs, with the RSSI of each neighboring AP being designated RSSI-AP. At 508 the method makes three determinations based on the operating parameters of the AP 200 determined at 502, 504 and 506. The first determination is whether the average RSSI of client devices RSSI-CL-AVG is greater than or equal to a minimum RSSI threshold of client devices (MRCLTH) (RSSI-CL-AVG≥MRCLTH). The second determination is whether the RSSI-AP of neighboring APs is greater than or equal to a minimum RSSI threshold (MRAPTH) for at least N of the neighboring APs. The number of neighboring APs is designated NNAP and the third determination at 508 is whether the number of neighboring APs is greater than neighboring APs threshold NAPTH.

When all three determinations at 508 are true, the method 500 at 510 reduces the Tx power of the AP 200. The justification for lowering the Tx power of the AP is that if most of the client devices connected to the AP 200 have an RSSI above the minimum threshold MRCLTH, and these client devices are proximate at least N neighboring APs, and the AP 200 has at least NNAP neighboring APs with an RSSI-AP greater than the minimum threshold MRAPTH, then lowering the TX power of the AP results in client devices at the edges of the coverage zone CZ of the AP connecting to one of the neighboring APs. Thus, connectivity of the client devices and user experiences for users of these devices are maintained while the power consumption of the AP is reduced, which is beneficial when the AP is operating in the RC mode as discussed above. After the method 500 reduces the Tx power of the AP 200 at 510, at 512 the method determines if the Tx power of the AP is less than or equal to a minimum Tx power PMIN for the AP, and if so at 514 the method stops.

At 516, the method 500 determines if any two of the three determinations at 508 are not true. If this determination is negative, then the method 500 returns to 502. If determination at 516 is true, then at 518 the method increases the Tx power of the AP. The Tx power of the AP 200 is increased in this situation to ensure adequate connectivity and coverage for client devices connected to the AP. Once the Tx power of the AP 200 is increased at 518, the method 500 at 520 determines if the Tx power is greater than or equal to a maximum Tx power PMAX. If the determination at 520 is positive the method 500 at 514 terminates, and if the determination is negative the method returns to 502.

Figure 6A:
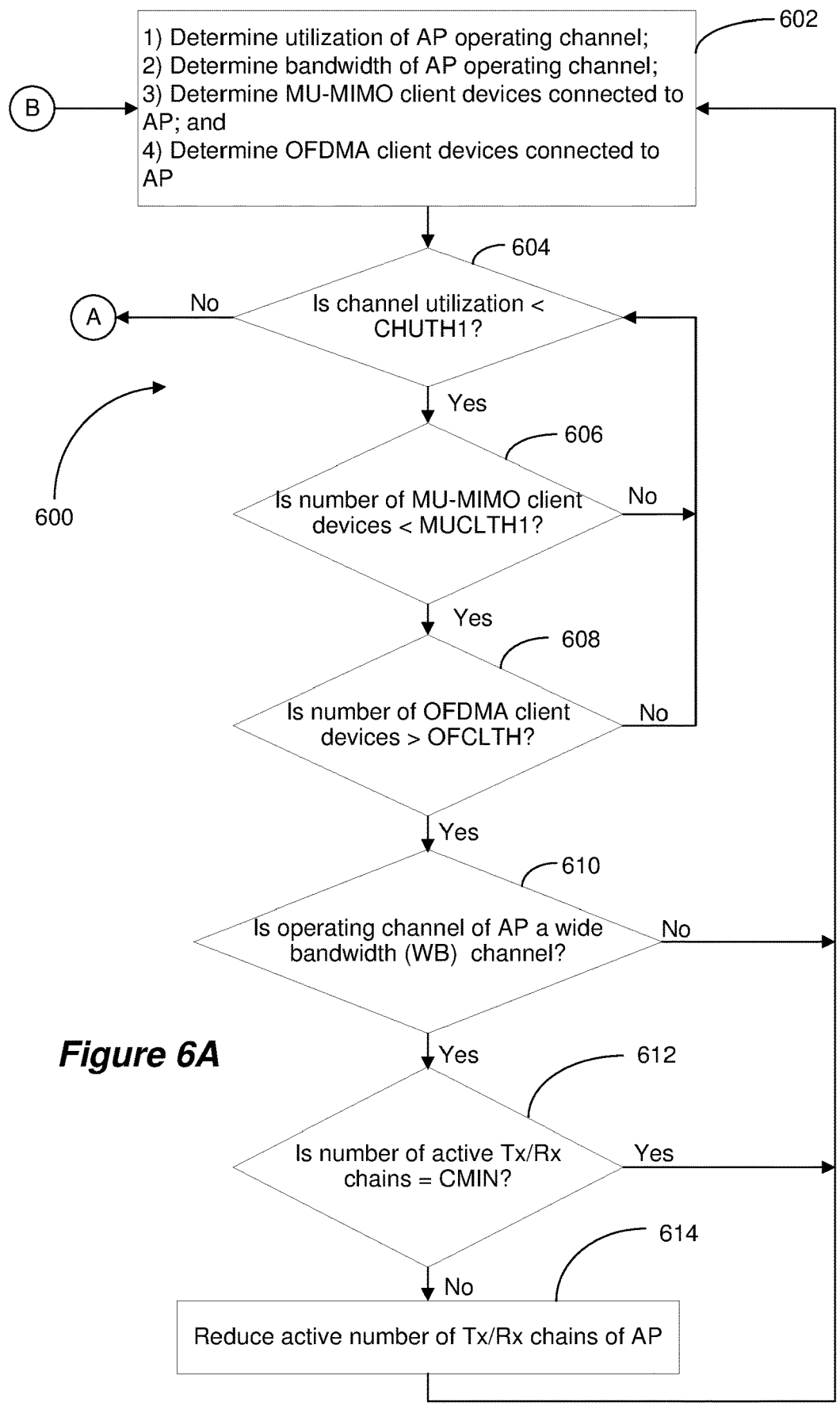
FIGS. 6A and 6B illustrate a method implemented by the ACC module of FIG. 2 to adaptively control the number of active transmit (Tx)/receive (Rx) chains based on selected operating parameters of the wireless access points according to embodiments of the present disclosure.
Figure 6B:
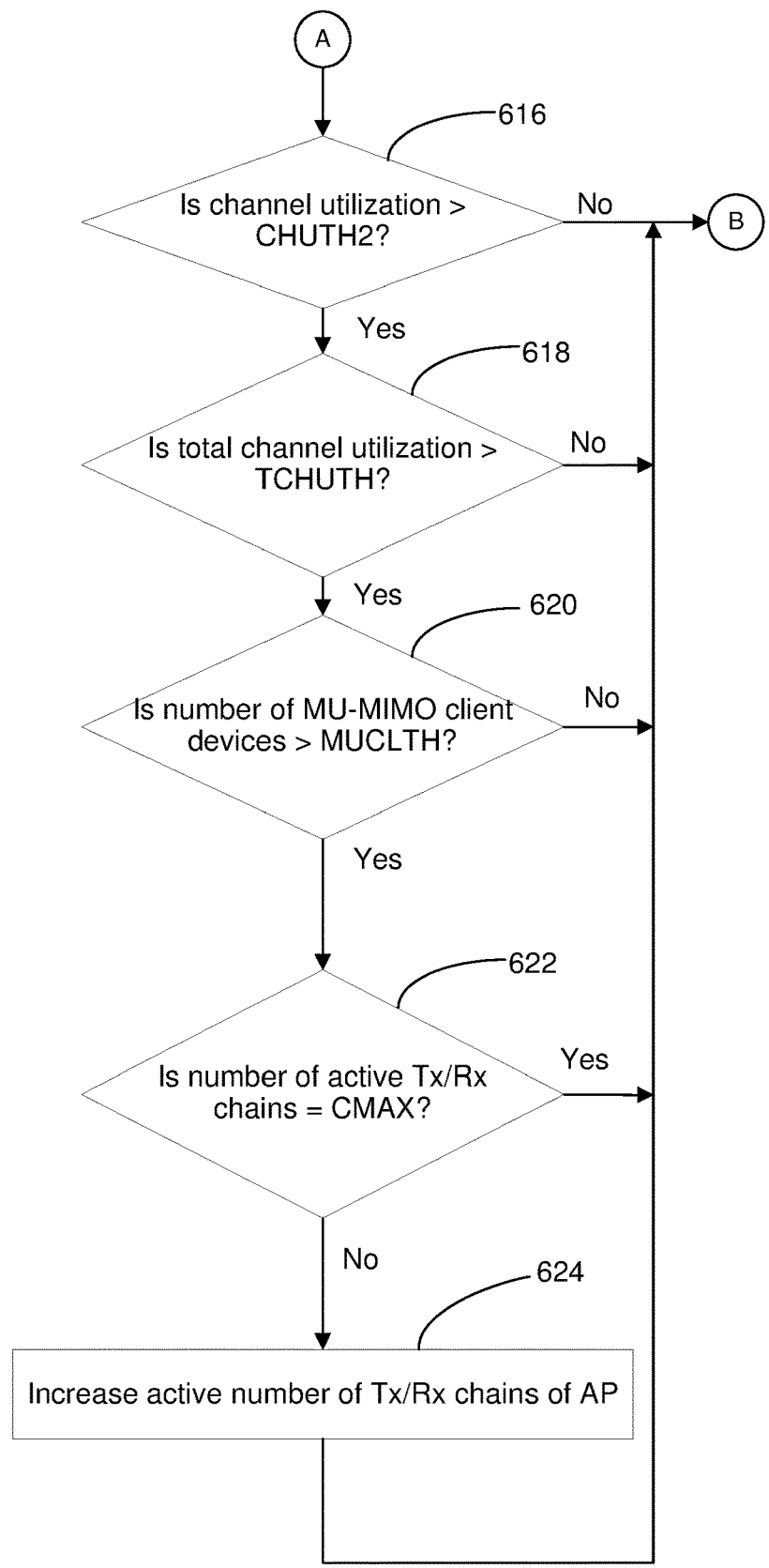

FIGS. 6A and 6B illustrate a method 600 implemented by the ACC module 202 of FIG. 2 to adaptively control the number of active transmit Tx chains 220 and Rx chains 222 based on selected operating parameters of the wireless AP 200 according to embodiments of the present disclosure. The method 600 at 602 makes four determinations regarding operating parameters of the wireless AP 200. First, at 602 the method 600 determines the utilization of the current channel over which the AP 200 is communicating to client devices connected to the AP, with this current channel also being referred to as the "operating channel" of the AP in the present description and figures. Second, at 602 the bandwidth of the current AP channel is determined. Third, the number of MU-MIMO client devices connected to the AP 200 is determined. Finally, the number of orthogonal frequency division multiple access (OFDMA) client devices connected to the AP 200 is determined. OFDMA is a multi-user version of orthogonal frequency division multiplexing (OFDM) which enables concurrent communication in both directions between the AP 200 and multiple client devices using different frequency resources, as will be understood by those skilled in the art.

The method 600 at 604 determines whether channel utilization of the channel over which the AP 200 is connected to client devices is less than a channel utilization threshold CHUTH1. If the determination at 604 is positive, then the method 600 at 606 determines whether the number of MU-MIMO client devices is less than a threshold MUCLTH1. If the determination at 606 is negative the method 600 returns to 604. If the determination at 606 is positive then method 600 at 608 determines whether the number of OFDMA client devices connected to the AP 200 is greater than a threshold OFCLTH. When the determination at 608 is negative the method 600 returns to 604. When the determination at 608 is positive the method 600 at 610 determines whether the operating channel over which the AP 200 is communicating with client devices is a wide bandwidth channel. The bandwidth of the operating channel over which the AP 200 communicates with client devices would typically be either 20 MHz or 40 MHz, or would be 20 MHz, 40 MHz or 80 MHz. Both the 20/40 MHz bandwidth and the 20/40/80 MHz bandwidth may be considered wide bandwidth channels in embodiments of the present disclosure. If the determination at 610 is negative the method 600 returns to 602.

When the determination at 610 is positive (e.g., the operating channel is either a 20/40 MHz bandwidth channel or a 20/40/80 MHz bandwidth channel), the method 600 at 612 determines whether the active number of Tx chains 220 and Rx chains 222 is equal to a minimum chain threshold CMIN. If the determination at 612 is positive, then the method 600 returns to 602. When the determination at 612 is negative, then method 600 at 614 reduces the active number of Tx chains 220 and Rx chains 222 of the AP 200. The justification for adaptively controlling the operating configuration of the AP 200 in this way is as follows. When the number of MU-MIMO client devices connected to the AP 200 is relatively low while the number of OFDMA client devices connected to the AP is relatively large, the reduction in the number of active Tx chains 220 and Rx chains 222 is mitigated when wide bandwidth channels (40/80 MHz) are utilized. Thus, in this situation reducing the active number of Tx chains 220 and Rx chains 222 will not adversely affect the performance and operation of the AP 200 and client devices connected to the AP.

When the determination at 604 is negative, the method 600 goes to 616 in FIG. 6B and determines whether channel utilization of the channels over which the AP 200 communicates with client devices is greater than a threshold CHUTH2. If the determination at 616 is negative the method 600 returns to 602. When the determination at 616 is positive, the method 600 at 618 determines whether total channel utilization is greater than a threshold TCHUTH. The total channel utilization is the utilization of a channel by all APs on the channel, where these other APs on the channel may be termed co-channel APs, as described in more detail below with reference to FIG. 7. If the determination at 618 is negative the method 600 returns to 602. When the determination at 618 is positive the method 600 at 620 determines whether the number of MU-MIMO client devices is greater than a threshold MUCLTH. If this determination at 620 is negative the method 600 once again returns to 602 while if the determination is positive the method at 622 determines whether the number of active Tx chains 220 and Rx chains 222 is equal to a chain threshold CMAX. When the determination at 622 is positive the method 600 returns to 602 and if the determination is negative the method at 624 increases the active number of Tx chains 220 and Rx chains 222 of the AP 200. After 624 the method 600 returns to 602. The method 600 at 616-624 may incrementally increase the active number of Tx chains 220 and Rx chains 222 of the AP 200 until the maximum number of chains are activated when the operating conditions of AP indicate such an increase is advantageous. This control is advantageous when the operating channel is congested (i.e., when utilization of the operating channel is high). In this situation, the utilization of MU-MIMO is advantageous because it allows the same operating channel to be used for multiple simultaneous transmission using different antennas of different active Tx/Rx chains 220, 222. This is possible only when the number of MU-MIMO capable client devices is significant, meaning the number of MU-MIMO capable client devices is greater than the threshold MUCLTH in step 620 in the embodiment of FIG. 6B.

Figure 7:
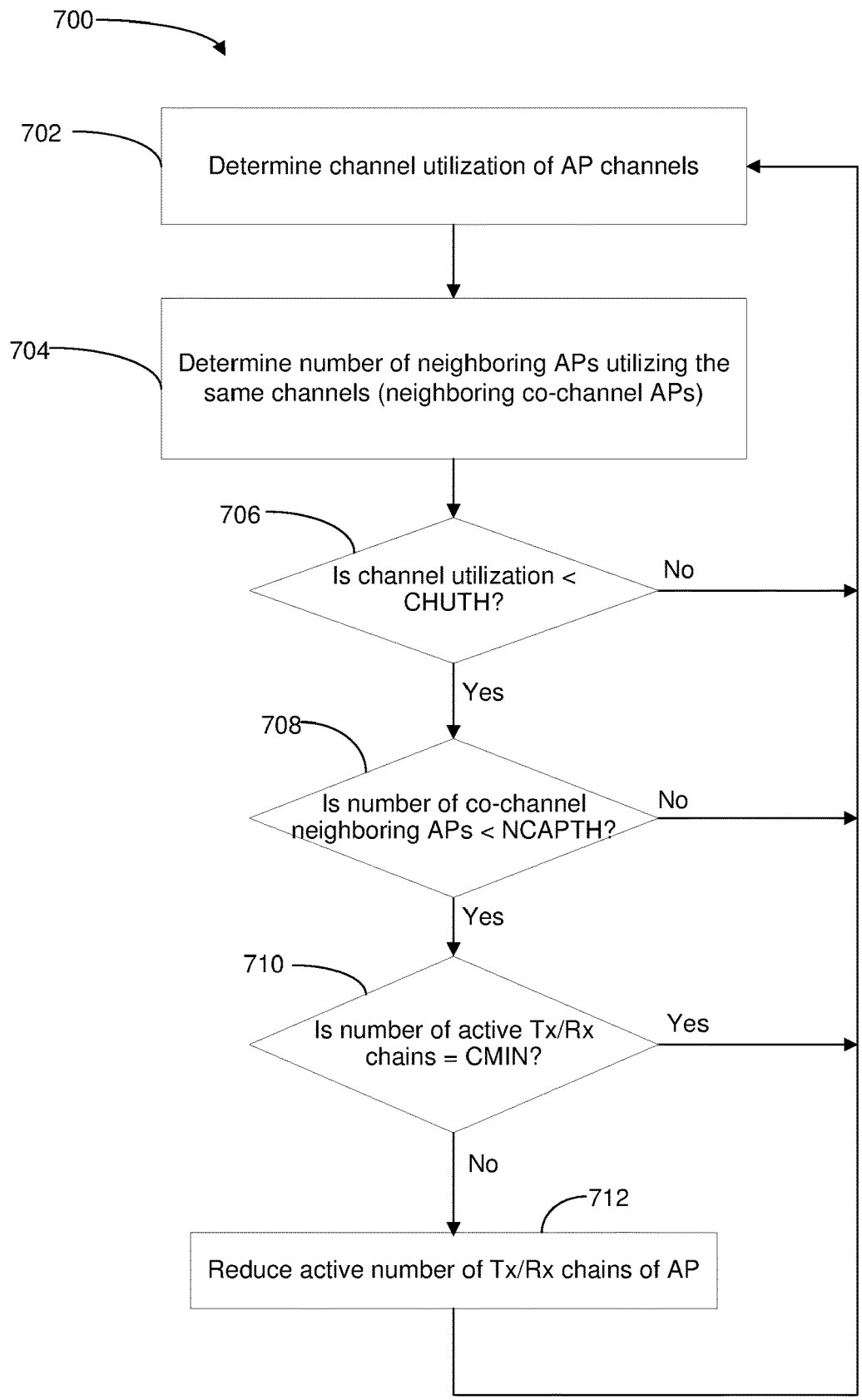
FIG. 7 illustrates another method implemented by the ACC module of FIG. 2 to adaptively control the number of active Tx/Rx chains based on further selected operating parameters of a wireless access point according to embodiments of the present disclosure.

FIG. 7 illustrates a further method 700 implemented by the ACC module 202 of FIG. 2 to adaptively control the number of active Tx chains 220 and Rx chains 222 based on further detected operating parameters of the wireless AP 200 according to embodiments of the present disclosure. At 702 the method 700 determines the utilization of the channel over which the AP is connected to client devices At 704 the method 700 determines the number of neighboring co-channel APs. A neighboring co-channel AP is a neighboring AP that is communicating with client devices connected to this neighboring AP over the same operating channel being utilized by the AP 200 to communicate with client devices. To obtain this information for co-channel APs, the wireless AP 200 may communicate with neighboring APs, such as through the wired communication links 106, 108 discussed above with reference to FIG. 1. Alternatively, the AP may also obtain this information for co-channel APs in a passive manner by "listening" or sensing transmissions on the operating channel by neighboring APs.

At 706 the method 706 determines whether the channel utilization is less than a channel utilization threshold CHUTH. If this determination at 706 is negative the method 700 returns to 702 and if the determination is positive the method goes to 708 and determines if the number of neighboring co-channel AP is less than a threshold NCAPTH. When the determination at 708 is negative the method 700 returns to 702 and if positive the method at 710 determines if the active number of Tx chains 220 and Rx chains 222 is equal to a chain minimum CMIN. If the determination at 710 is positive the method 700 returns to 702 and if negative the method at 712 reduces the number of active Tx chains 220 and Rx chains 222 of the AP 200 to thereby lower the power consumption of the AP during operation in the RC mode. The justification for reducing the active number of Tx chains 220 and Rx chains 222 in this situation is that if channel utilization of the AP 200 is low and there are a moderate number of neighboring co-channel APs present, then this is an indication that the AP is lightly loaded by the current client devices connected to the AP. In this situation the AP 200 is "lightly loaded" in the sense that the current client devices connected to the AP are not transmitting or receiving significant amounts of data through the AP. Thus, reducing the active Tx chains 220 and Rx chains 222 of the AP 200 will not significantly impact the performance or user experience of users of these client devices, with some client devices perhaps connecting to neighboring co-channel AP as a result of the reduction in active Tx chains 220 and Rx chains 222 of the AP 200.

Figure 8A:
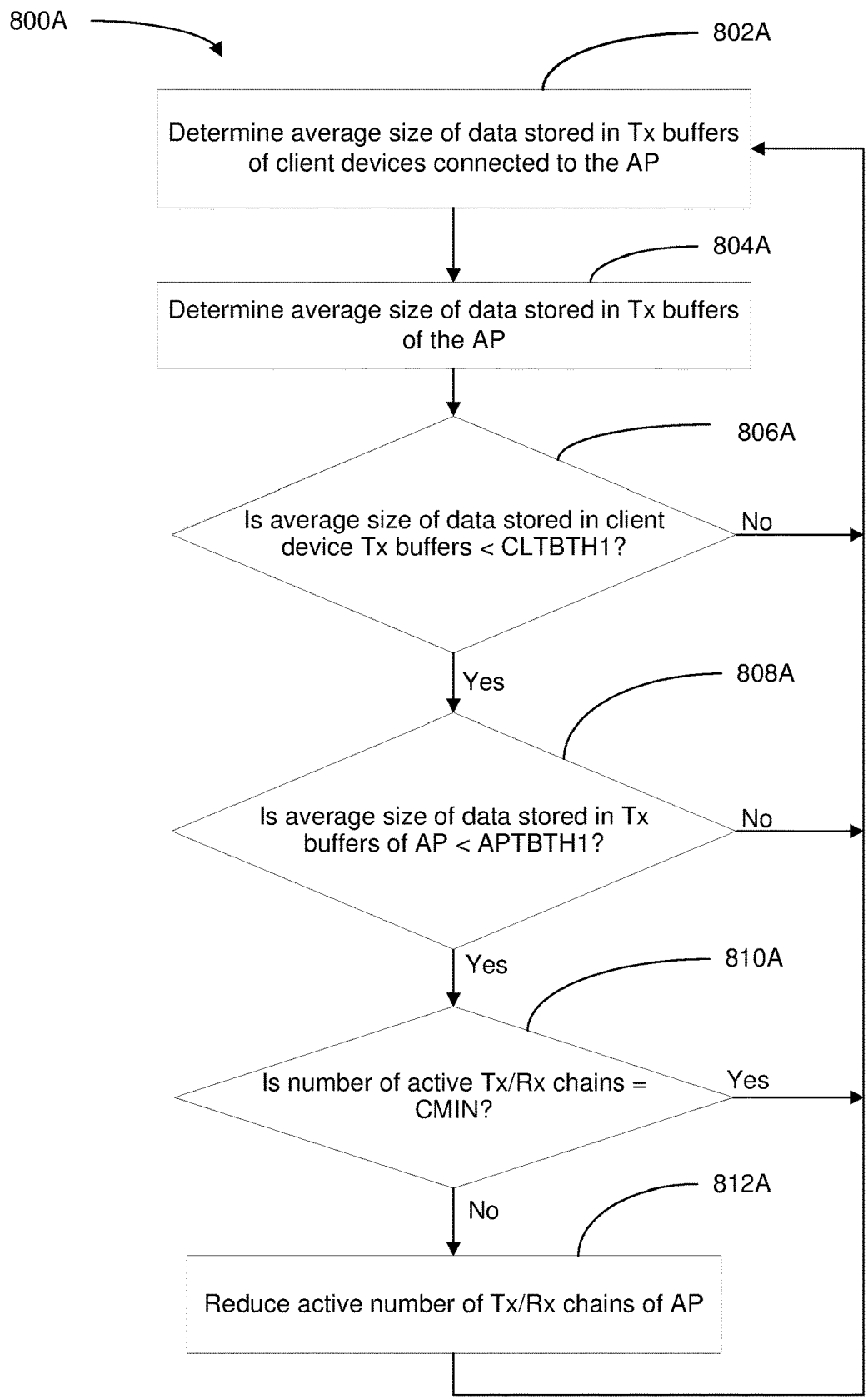
FIGS. 8A and 8B illustrate further methods implemented by the ACC module of FIG. 2 to adaptively control the number of active Tx)/Rx chains based on further selected operating parameters of a wireless access point according to embodiments of the present disclosure.
Figure 8B:
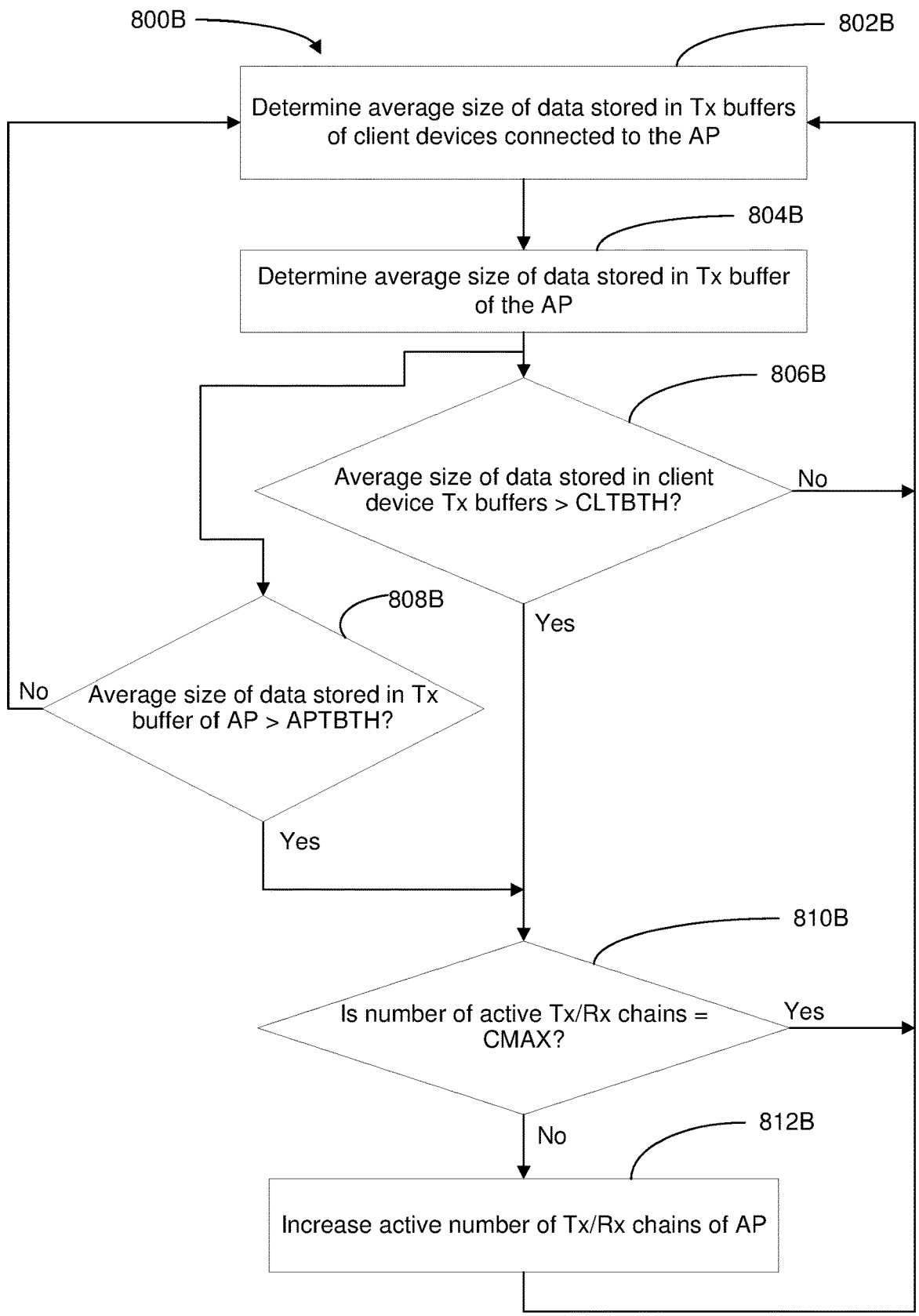

FIGS. 8A and 8B illustrate further methods 800A and 800B implemented by the ACC module 202 of FIG. 2 to adaptively control the number of active Tx chains 220 and Rx chains 222 based on further selected operating parameters of the wireless AP 200 according to further embodiments of the present disclosure. The method 800A reduces the active number of Rx chains 220 and Rx chains 220 if appropriate to reduce power consumption of the AP 200 while the method 800B increases the active Tx and Rx chains if appropriate to maintain coverage of client devices connected to the AP. The methods 800A and 800B utilize the operating parameters of the size of data queued or stored in Tx buffers of client devices connected to the AP 200 as well as data queued in the Tx buffer 224 of the AP 200. See FIGS. 1 and 2 and the above discussion of the Tx buffer 105 in client device 104-2 as well the discussion of the Tx buffer 224 in the AP 200. As will now be explained with reference to FIGS. 8A and 8B, the method 800A lowers the number of active Tx/Rx chains 220, 222 when traffic or load on the operating channel is low as indicated by small buffer occupancy (i.e., amount of data stored in Tx buffers)) and, conversely, method 800B increases the number of active Tx/Rx chains 220, 220 when traffic or load on the operating channel is high as indicated by large buffer occupancy.

In the method 800A of FIG. 8A, at 802A the method at 802A determines the average size of the amounts of data stored in the Tx buffers of client devices connected to the AP 200. In order to determine the average size, the amount of data stored in the Tx buffers of the client devices may be obtained using Buffer Status Reports as defined in IEEE 802.11, for example, or using proprietary methods. At 804A the method 800A determines the size of data stored in the Tx buffer 224 of the AP 200, or the average size of data stored in multiple Tx buffers of the AP if the AP includes multiple Tx buffers. At 806A, the method 800A determines whether the average size of data queued in the Tx buffers of client devices is less than a client transmit buffer threshold CLTBTH1. If the determination at 806A is negative the method 800A goes back to 802A and if positive the method at 808A determines whether the buffered data stored in the Tx buffer 224 of AP 200, or the average size of buffered data stored in multiple Tx buffers of the AP, is less than an AP transmit buffer threshold APTBTH1. If the determination 808A is negative the method 800A returns to 802A and if positive the method at 810A determines whether the active number of Tx chains 220 and Rx chain 222 of the AP 200 is equal to a minimum number of active chains CMIN. If the determination at 810A is positive, the method 800A returns to 802A while if the determination is negative the method at 812A reduces the active number of Tx chains 220 and Rx chains 222 of the AP 200 to reduce the power consumption of the AP.

The justification for the ACC module 202 adaptively controlling the operating configuration of the AP 200 in this way is that if there is limited communication demand of the AP by the client devices connected to the AP then the number of active Tx chains 220 and Rx chains 222 may be reduced to lower the power consumption of the AP without adversely affecting operation of the client devices. This is true because the queued or buffered data stored in the Tx buffers 105 of the client devices and the Tx buffer 224 of the AP 200 are less than the associated thresholds CLTBTH1 and APTBTH1, which indicates that the communication demand or needs of the client devices connected to the AP are low. As a result, reducing the active number of Tx chains 220 and Rx chains 222 will not adversely affect the operation and user experiences of users of these client devices.

The method 800B of FIG. 8B is similar to the method 800A of FIG. 8B except functions in an opposite manner. This method will accordingly not be described in the same level of detail as the method 800A but will be understood from the description above of the method 800A. One difference between method 800A and method 800B is that the method 800A determines whether the client device Tx buffers and the AP Tx buffers have enough free space (e.g., the data amount in the buffer is less than a threshold) such that the number of chains may be reduced while the method 800b determines whether either the client device Tx buffer or the AP Tx bugger occupancy is high enough (e.g., greater than a threshold) such that the number of chains may be increased. The method 800B at 812B increases the active number of Tx chains 220 and Rx chains 222 of the AP to maintain adequate capacity or bandwidth for communications with client devices and user experiences of client devices connected to the AP 200 where the amounts of data being queued in the Tx buffers 105 of client devices or the Tx buffer 224 of the AP 200 are relatively large. These relatively large amounts of data being queued in the Tx buffers 105, 224 indicate potential delays in communicating data between the AP and client devices, which may adversely affect user experiences of the client devices. In the method 800B of FIG. 8B, if at 806B the average data queued in the Tx buffers 105 of client devices is greater than a threshold CLTBTH, or at 808B the average data queued in the 224 of the AP 200 is greater than a threshold APTBTH, then at 812B the active number of Tx/Rx chains 220, 222 of the AP 200 is increased, unless already at a maximum number of chains CMAX as determined at 810B. Increasing the active number of Tx chains 220 and Rx chains at 812B when appropriate means more Tx chains 220 and Rx chains 222 in the AP 200 are available to communicate data to client devices, which may be expected to reduce the amount of queued data stored in the Tx buffers 105, 224 and improve the experiences for users of these client devices.

Figure 9:
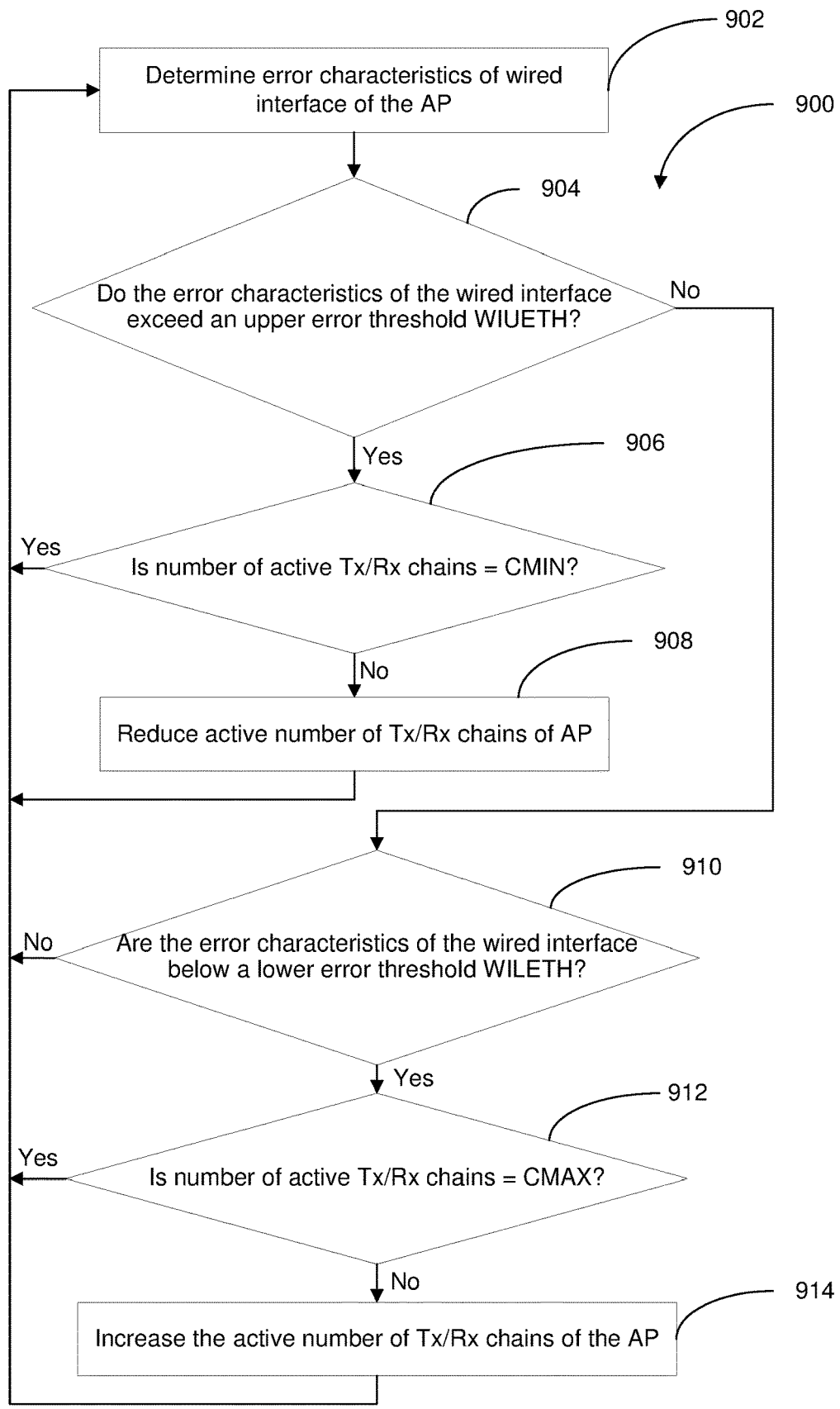
FIG. 9 illustrates another method implemented by the ACC module of FIG. 2 to adaptively control the number of active Tx/Rx chains based on operating characteristics of a wired interface of a wireless access point according to embodiments of the present disclosure.

FIG. 9 illustrates a further method 900 implemented by the ACC module 202 of FIG. 2 to adaptively control the number of active Tx chains 220 and Rx chains 222 of the AP based on the operating parameter of the operation of a wired interface of the AP 200 according to embodiments of the present disclosure. The wired interface of the AP 200 may correspond to the PoE port 210, for example, and may correspond to backhaul connection of the AP. A backhaul connection is typically high bandwidth wired communications link through which the wireless AP communicates with other components of a network including other APs, as will be appreciated by those skilled in the art. The method 900 adjusts the number of active Tx chains 220 and Rx chains of the AP 200 based on the operating characteristics of the wired connection of the AP. When the error rate of data being communicated over the wired connection is high, data congestion on this wired link may adversely affect the operation of the link. In this situation the AP 200 is unable to transmit the desired amount of data over the wired link, and if this is true then power consumption of the AP may be lowered by reducing the active number of Tx chains 220 and Rx chains 222. Conversely, if error rates on the wired link are lower than expected, the AP 200 is able to transmit additional data over the wired link. If this is true, then method 900 increases the active number of Tx chain 220 and Rx chains 222, enabling more data to be communicated between the AP and the connected client devices.

The method 900 at 902 determines the error characteristics of the wired interface of the AP 200. At 904 the method 900 determines whether the determined error characteristics exceed an upper error threshold WIUETH of the wired link. If the determination at 904 is true, at 906 the method 900 determines whether the number of active Tx chains 220 and Rx chains 222 of the AP is equal to a minimum number of active chains for the AP. If the determination at 906 is true then the method 900 returns to 902. If the determination at 906 is negative, at 908 the method 900 reduces the active number of Tx chains 220 and Rx chains of the AP to lower the power consumption of the AP without adversely affecting the operation of the client devices. When the determination at 904 is not true, at 910 the method 900 determines whether the error characteristics of the wired link are below a wired line lower error threshold WILETH. If the determination at 910 is negative, the method 900 returns to 902 while if this determination is positive the method at 912 determines if the active number of Tx chains 220 and Rx chains 222 is equal to a maximum number of chains CMAX for the AP 200. If the active Tx chains 220 and Rx chains 222 of the AP is equal to the maximum number of active chains CMAX at 912, the method 900 returns to 902. If the determination at 912 is negative, the method 900 at 914 increases the active number of Tx chains 220 and Rx chains of the AP 200, thereby increasing the amount of data communicated by client devices to AP for communication over the wired link, which has error characteristics indicating the wired link is performing well in this situation.

Figure 10:
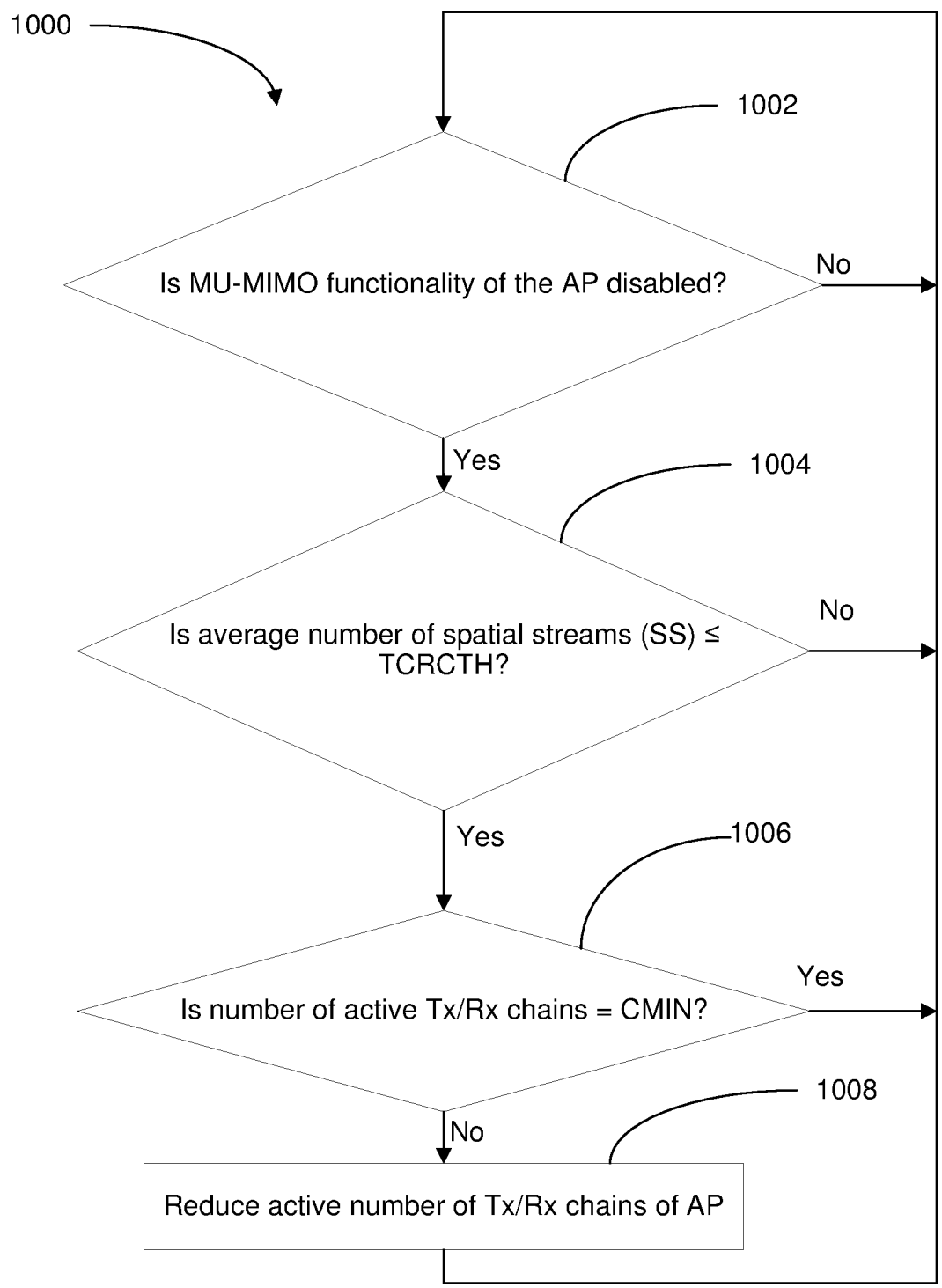
FIG. 10 illustrates another method implemented by the ACC module of FIG. 2 to adaptively control the number of active Tx/Rx chains based on spatial streams (SS) and multiple user (MU) multiple input, multiple output (MIMO) (MU-MIMO) operating characteristics of a wireless access point according to embodiments of the present disclosure.

FIG. 10 illustrates a method 1000 implemented by the ACC module 202 of FIG. 2 to adaptively control the number of active Tx chains 220 and Rx chains 222 of the AP 200 based on spatial streams (SS) and multiple user (MU) multiple input, multiple output (MIMO) (MU-MIMO) operating characteristics of the AP according to embodiments of the present disclosure. The method 1000 at 1002 determines whether MU-MIMO functionality of the AP 200 is disabled. If this determination is negative the method 1000 remains at 1002 and occasionally checks this determination. When the determination at 1002 is positive, the method 1000 at 1004 determines whether an average number of spatial streams (SS) of the AP 200 is less than or equal to an active Tx chains 220 and Rx chains 222 threshold TCRCTH. If this determination at 1004 is negative the method 1000 returns to 1002 and if this determination is positive then at 1006 the method determines whether the active number of Tx chains 220 and Rx chains 222 is equal to a minimum threshold CMIN.

When the determination at 1006 is positive the method 1000 returns to 1002. Conversely, when the determination at 1006 is negative the method 1000 at 1008 reduces the active number of Tx chains 220 and Rx chains 222 of the AP 200. The method 1000 then returns to 1002. The justification for adaptively controlling the operating configuration of the AP 200 in this manner is as follows. When the MU-MIMO of the AP 200 is disabled, meaning only SU-MIMO client devices are connected to the AP, and the average number of spatial streams SS supported by the SU-MIMO client devices is low, reduction in the number of active Tx chains 220 and Rx chains 222 of the AP will not significantly impact the throughput and operation of the AP and thus will not significantly impact the performance of the client devices connected to the AP.

Figure 11:
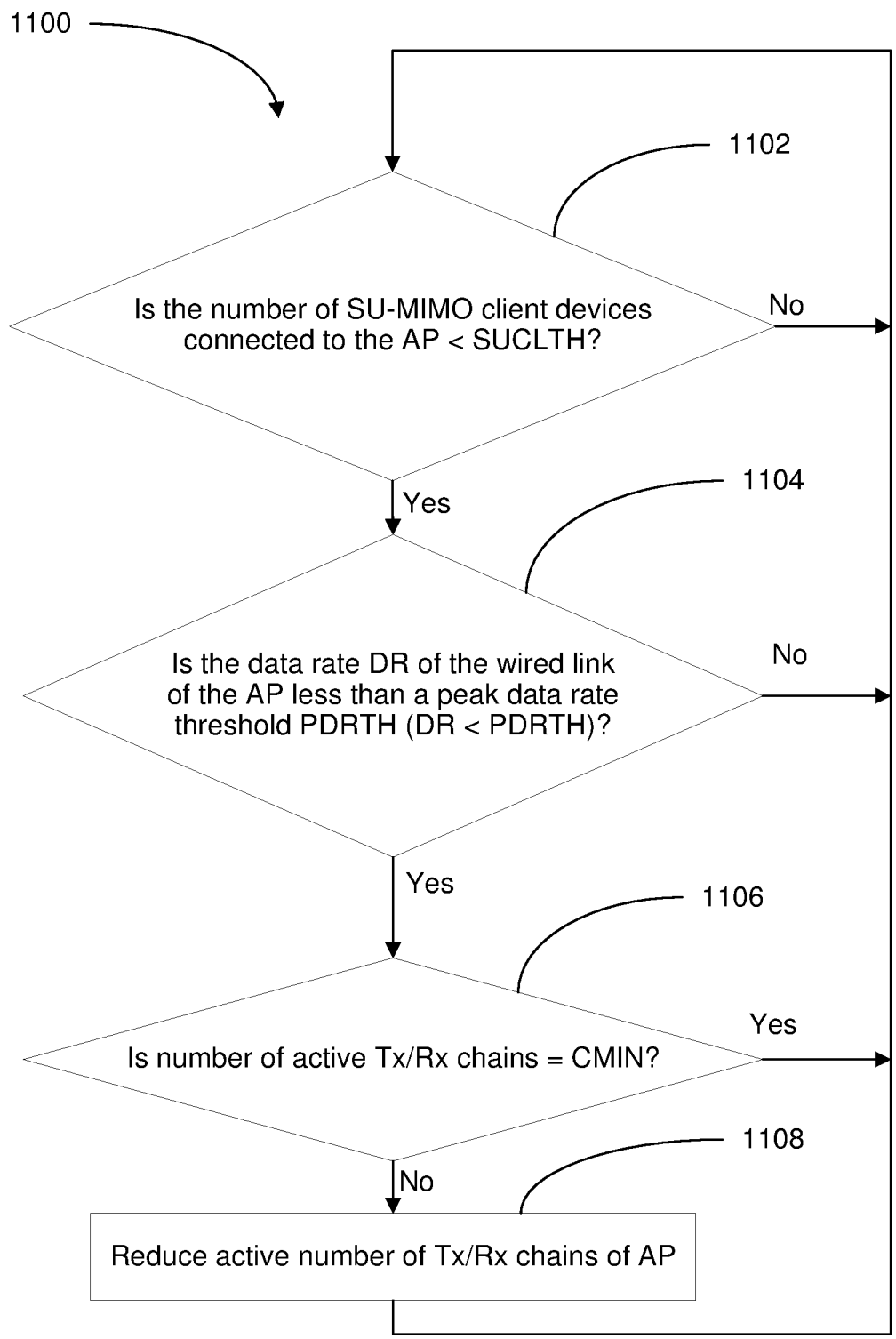
FIG. 11 illustrates a method implemented by the ACC module of FIG. 2 to adaptively control the number of active Tx/Rx chains based on client devices and wired interface characteristics of a wireless access point according to embodiments of the present disclosure.

FIG. 11 illustrates a method 1100 implemented by the ACC module 202 of FIG. 2 to adaptively control the number of active Tx/Rx chains based on client devices and wired interface characteristics of the wireless AP 200 according to embodiments of the present disclosure. The method 1100 at 1102 determines whether the number of SU-MIMO client devices connected to the AP 200 is less than a threshold SUCLTH. A SU-MIMO client device may only communicate to the AP 200 through the SU-MIMO approach and technology and not through the MU-MIMO approach and technology. If the determination at 1102 is negative the method 1100 remains at 1102 and occasionally checks this determination. When the determination at 1102 is positive the method 1100 at 1104 determines whether a data rate DR of a wired link of the AP 200 is less than a peak data rate threshold PDRTH for the wired link. If this determination is negative the method 1100 returns to 1102. When the determination at 1104 is positive the method 1100 at 1106 determines whether the number of active Tx chains 220 and Rx chains 222 in the AP 200 is equal to a minimum threshold CMIN. If this determination 1106 is positive, then no further Tx chains 220 and Rx chains 222 in the AP 200 may be deactivated and the method 1100 returns to 1102. Conversely, when the determination at 1106 is negative the method 1100 at 1108 deactivates some of the Tx chains 220 and Rx chains 222 of the AP. The justification for adaptively controlling the operating configuration of AP 200 in this way is that if the wired link of the AP 200 is not operating at an adequate data rate, then reducing the active number of Tx chains 220 and Rx chains 222 of the AP will not significantly reduce the performance or throughput of the AP and will not adversely affect the performance of client devices connected to the AP.

Figure 12:
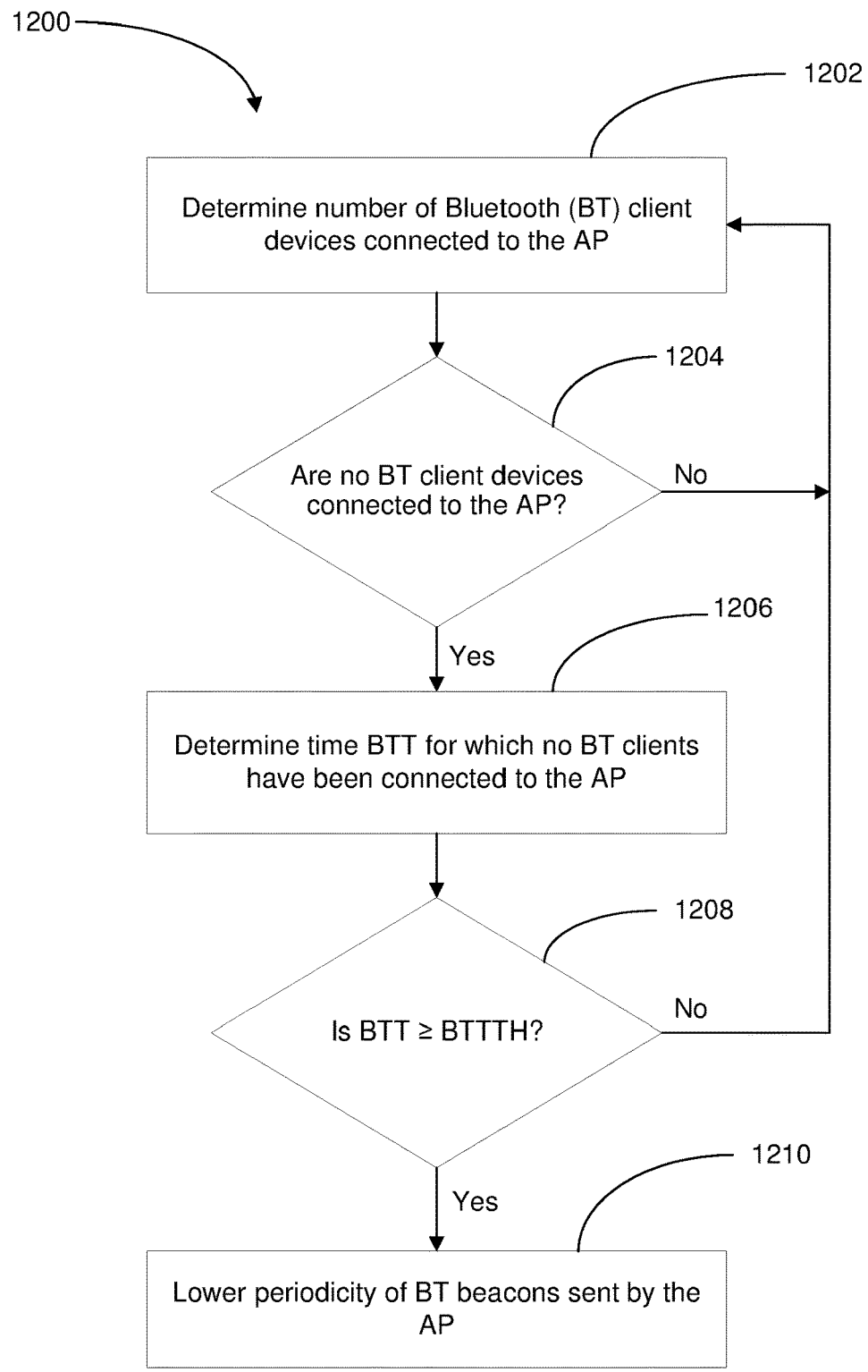
FIG. 12 illustrates a method implemented by the ACC module of FIG. 2 to adaptively control Bluetooth functionality of a wireless access point according to embodiments of the present disclosure.

FIG. 12 illustrates a method 1200 implemented by the ACC module 202 of FIG. 2 to adaptively control Bluetooth functionality of the AP 200 according to embodiments of the present disclosure. At 1202 the method 1200 determines the number of Bluetooth client devices connected to the AP 200. At 1204, the method 1200 determines whether no Bluetooth client devices are currently connected to the AP 200. When the determination at 1204 is negative, the method 1200 returns to 1202. Conversely, when the determination at 1204 is positive the method 1200 at 1206 determines the time BTT for which no Bluetooth client devices have been connected to the AP 200. At 1208, the method 1200 determines whether the time BTT for which no Bluetooth client devices have been connected to the AP 200 is greater than the threshold BTTTH. If the determination at 1208 is negative the method 1200 returns 1202. When the determination at 1208 is positive, the method 1200 at 1210 lowers the periodicity or frequency at which Bluetooth beacons are transmitted by the Bluetooth transceiver 216 (FIG. 2) of the AP 200. As will be understood by those skilled in the art, the Bluetooth transceiver 216 will periodically transmit Bluetooth beacons to detect Bluetooth client devices proximate the AP 200 connection to the AP. When no Bluetooth client devices are detected proximate the AP 200 for a certain amount of time, namely the threshold BTTH, the method 1200 reduces the power consumption of the AP 200 by reducing the periodicity or frequency at which the Bluetooth transceiver 216 transmits Bluetooth beacons. The operation of Bluetooth client devices will not be adversely affected in the situation because no such devices are connected to the AP.

Figure 13:
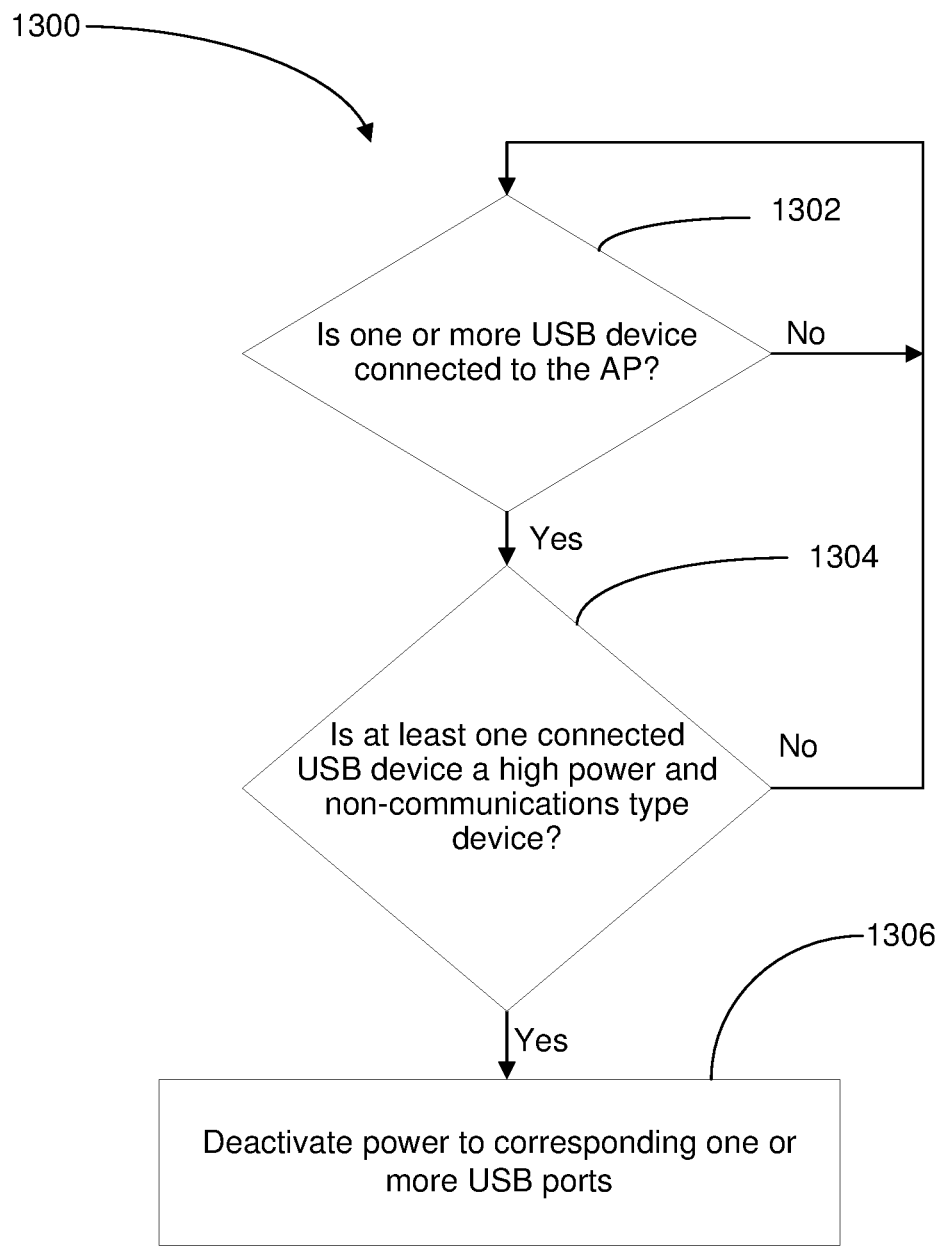
FIG. 13 illustrates a method implemented by the ACC module of FIG. 2 to adaptively control universal serial bus (USB) functionality of a wireless access point according to embodiments of the present disclosure.

FIG. 13 illustrates a method 1300 implemented by the ACC module 202 of FIG. 2 to adaptively control universal serial bus (USB) functionality of the AP 200 according to embodiments of the present disclosure. At 1302, the method 1300 determines whether one or more USB devices are connected to one or more USB ports of the AP 200, such as the USB port 214 in FIG. 2. If the determination at 1302 is negative, the method 1300 takes no further action. When the determination at 1302 is positive, at 1304 the method 1300 determines the type of USB device or devices connected to the AP 200 and whether any such connected devices are high-power and non-communications type USB devices. If the determination at 1304 is negative, the method 1300 returns to 1302. When the determination at 1304 is positive, this indicates at least one USB device connected to a USB port of the AP 200 is a high-power and non-communications type USB device. Accordingly, when the determination at 1304 is positive the method 1300 at 1306 deactivates power to the corresponding USB port or ports to thereby lower the power consumption of the AP 200.

Figure 14A:
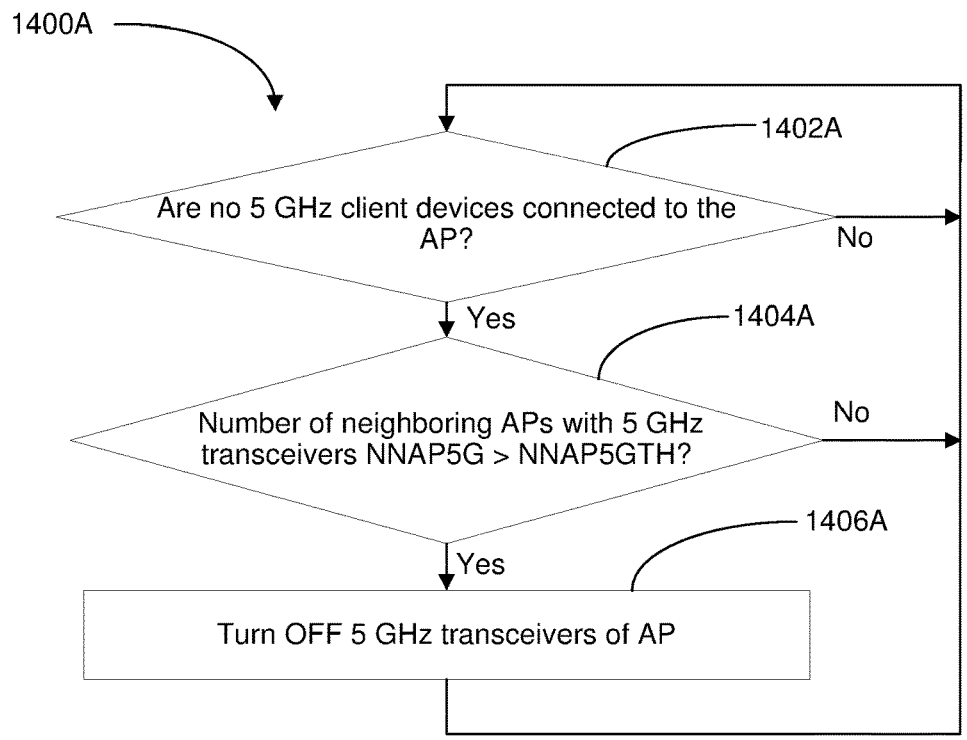
FIGS. 14A and 14B illustrate methods implemented by the ACC module of FIG. 2 to adaptively control activation and deactivation of multi-band radios of a wireless access point according to embodiments of the present disclosure.
Figure 14B:
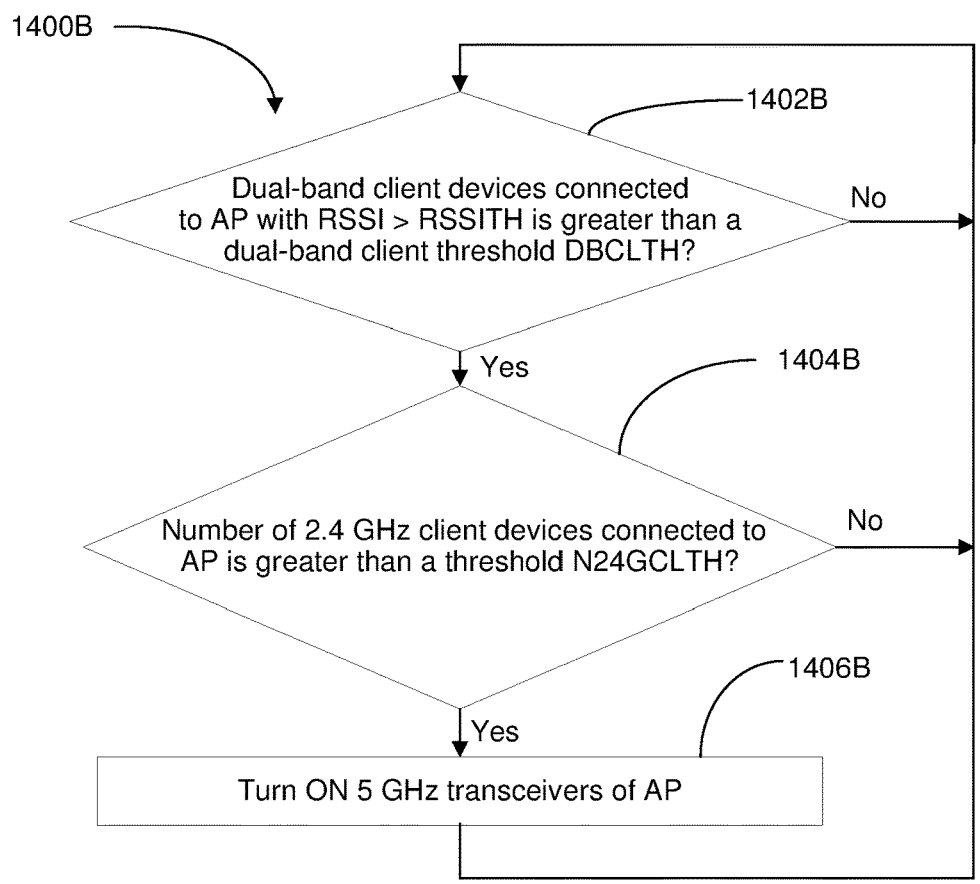

FIGS. 14A and 14B illustrate methods 1400A and 1400B implemented by the ACC module 202 of FIG. 2 to adaptively control activation and deactivation of dual-band radios of the wireless AP 200 according to embodiments of the present disclosure. The dual-band radios refer to wireless transceivers operating in the 2.4 GHz and 5 GHz frequency bands. For example, in the AP 200 of FIG. 2 the Wi-Fi transceiver 218 includes some Tx chains 220 and Rx chains 222 that operate in the 2.4 GHz frequency band and others that operate in the 5 GHz frequency band. As discussed above, embodiments of the AP 200 are not limited to adaptive control of dual-band radios and may include multi-band radios, such as tri-band radios (2.4 GHz, 5 GHz, and 6 GHz). The AP 200 including dual-band radios is described merely by way of example.

The method 1400A of FIG. 14A deactivates 5 GHz transceivers of the AP 200 to reduce power consumption of the AP when there are currently no 5 GHz client devices connected to the AP. At 1402A, the method 1400A determines whether no 5 GHz client devices are connected to the AP 200. When this determination is negative, the method 1400A remains at 1402A and periodically checks this determination. When the determination at 1402A is positive, the method 1400A at 1404A determines whether a number NNAP5G of neighboring APs having 5 GHz transceivers is greater than a threshold NNAP5GTH. If this determination at 1404A is negative the method 1400A returns to 1402A. When the determination at 1404A is positive, the method 1400A at 1406A turns off 5 GHz transceivers of the AP 200 to lower the power consumption of the AP. The justification for this adaptive control of the operating configuration of the AP 200 is that if no client devices are connected to the AP in the 5 GHz frequency band, transceivers of the AP in this 5 GHz frequency band may be deactivated to reduce the power consumption of the AP without sacrificing performance of client devices connected to the AP.

The method 1400B of FIG. 14B controls activation of 5 GHz transceivers in the AP 200 when the detected operating parameters of the AP indicate doing so may improve the performance of dual-band client devices connected to the AP. A dual-band client device is a device that includes transceivers that operate in both the 2.4 GHz and 5 GHz frequency bands. Initially, 5 GHz transceivers of the AP 200 are deactivated. At 1402B, the method 1400B determines whether a number of dual-band client devices currently connected to the AP 200 and having an RSSI greater than a threshold RSSITH is greater than a dual-band client threshold DBCLTH. This determination at 1402B indicates whether there are a relatively large number of dual-band client devices having relatively strong RSSIs currently connected to the AP 200. When this determination is negative, the method 1400B remains at 1402B and occasionally checks this determination. When the determination at 1402B is positive, the method 1400B at 1404B determines whether the number of 2.4 GHz client devices connected to the AP 200 is greater than the threshold N24GCLTH. This determination at 1404B indicates whether there are a relatively large number of client devices connected to the AP 200 through the 2.4 GHz frequency band.

When both the determinations at 1402B and 1404B are true, this indicates that some of the dual-band client devices currently connected to the AP 200 are connected through the 2.4 GHz frequency band even though these clients are capable of connecting through the 5 GHz frequency band. As a result, at 1406B the method 1400B turns ON or activates the 5 GHz transceivers of the AP 200. As a result, some of the dual-band client devices currently connected to the AP 200 through the 2.4 GHz frequency band may now connect through the 5 GHz frequency band, which may improve the performance or operation of these client devices.

Figure 15:
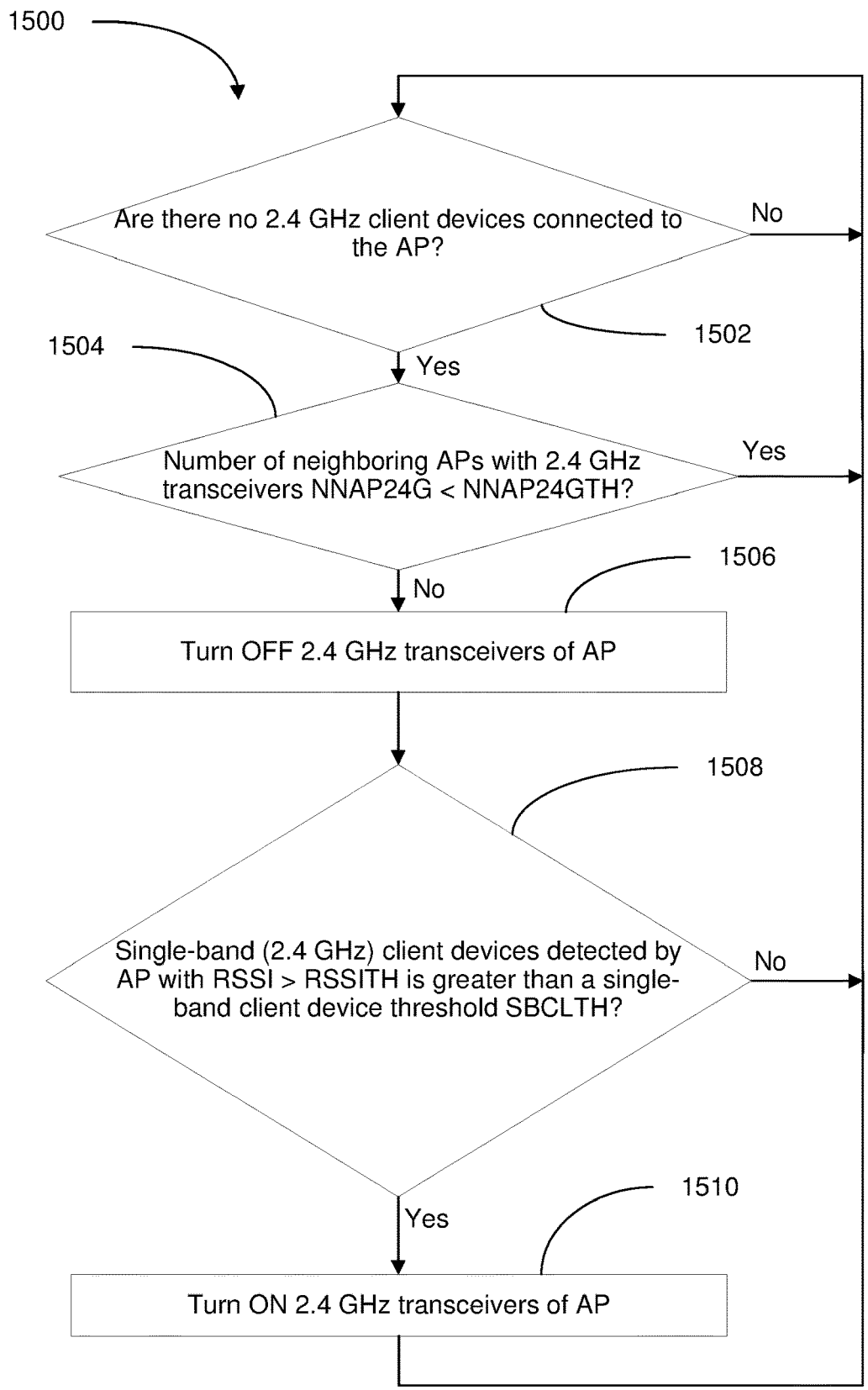
FIG. 15 illustrates a further method implemented by the ACC module of FIG. 2 to adaptively control activation and deactivation of multi-band radios based on client devices connected to the wireless access point and neighboring access points according to embodiments of the present disclosure.

FIG. 15 illustrates a method 1500 implemented by the ACC module 202 of FIG. 2 to adaptively control activation and deactivation of dual-band radios of the AP 200 based on detected operating parameters of client devices connected to the AP and neighboring APs according to embodiments of the present disclosure. The method 1500 at 1502 determines whether there are no single-band 2.4 GHz client devices connected to the AP 200. A single-band 2.4 GHz client device is a client device that only communicates over the 2.4 GHz frequency band. If this determination 1502 is negative then the method 1500 remains at 1502 and occasionally checks this determination. When the determination at 1502 is positive, the method 1500 at 1504 determines whether a number of neighboring APs having 2.4 GHz transceivers, which is designated as NNAP24G in FIG. 15, is less than a threshold NNAP24GTH. If this determination at 1504 is positive the method 1500 returns to 1502. When the determination at 1504 is negative, indicating there are sufficient number of neighboring APs having 2.4 GHz transceivers, the method 1500 at 1506 turns OFF or deactivates the 2.4 GHz transceivers of the AP 200. In this way, the method 1500 reduces the power consumption of the AP 200. Moreover, operation or performance of the 2.4 GHz client devices should not be adversely affected since these devices may now connect to one of the neighboring APs having 2.4 GHz transceivers.

At 1508 the method 1500 determines whether the number of single-band 2.4 GHz client devices detected by the AP 200 and having an RSSI greater than the threshold RSSITH is greater than a single-band client device threshold SBCLTH. This determination at 1508 indicates whether there are a sufficient number SBCLTH of single-band 2.4 GHz client devices proximate the AP 200 and thus having an RSSI>RSSITH to justify turning ON or activating the 2.4 GHz transceivers of the AP 200. When the determination at 1508 is negative, the method 1500 returns to 1502. When the determination at 1508 is positive, the method 1500 at 1510 activates the 2.4 GHz transceivers of the AP 200, enabling the relatively large number of single-band 2.4 GHz client devices to connect to the AP and thereby improving the performance and operation of these single-band client devices.

Figure 16:
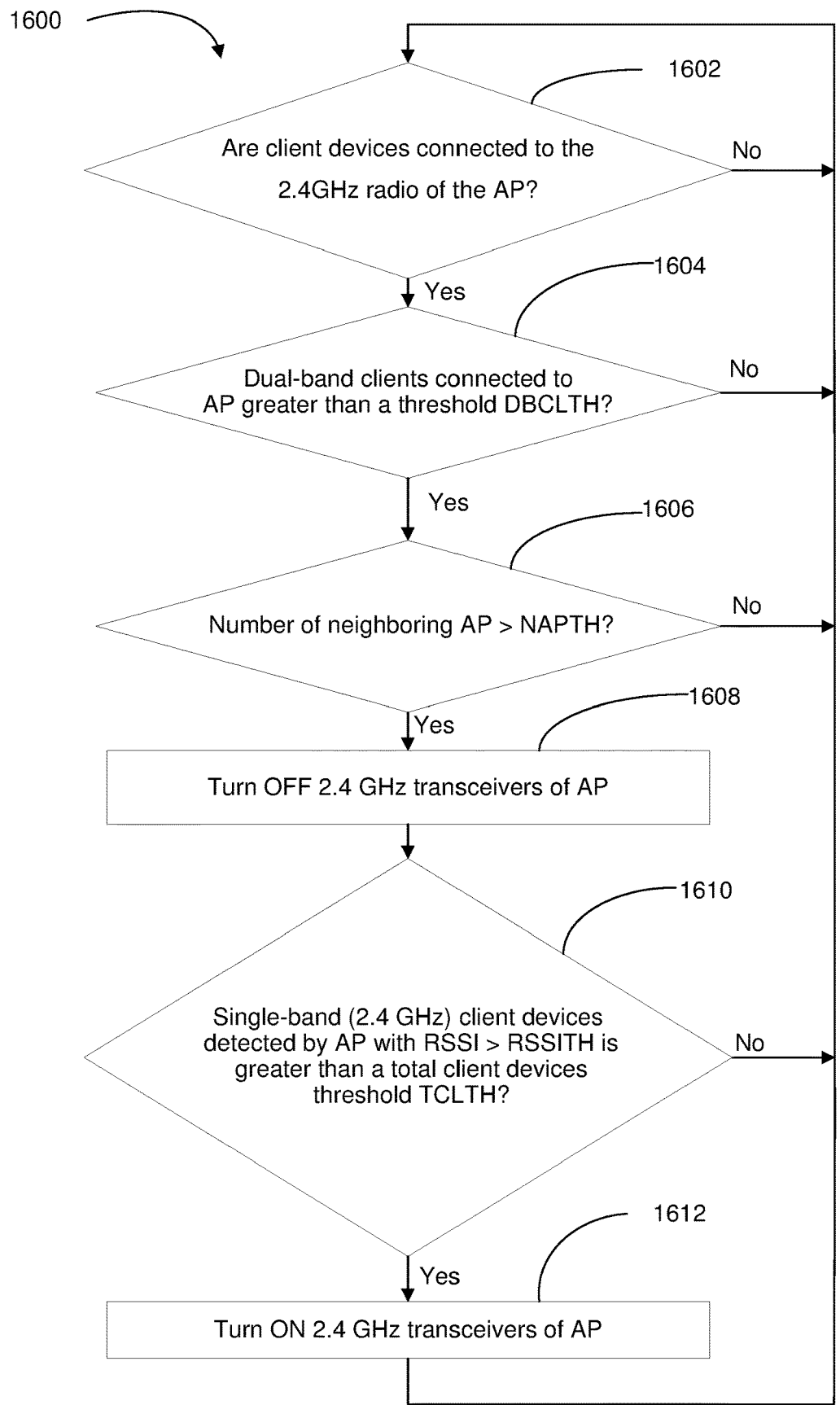
FIG. 16 illustrates a still further method implemented by the ACC module of FIG. 2 to adaptively control activation and deactivation of multi-band radios based on client devices connected to the wireless access point and neighboring access points according to embodiments of the present disclosure.

FIG. 16 illustrates a further method 1600 implemented by the ACC module 202 of FIG. 2 to adaptively control activation and deactivation of dual-band radios based on client devices connected to the wireless AP 200 and neighboring APs according to embodiments of the present disclosure. The method 1600 at 1602 determines whether there are any client devices connected to the 2.4 GHz radio the AP 200. If the determination at 1602 is negative the method 1600 remains at 1602 and occasionally checks this operating parameter. When the determination at 1602 is positive, at 1604 the method 1600 determines whether the number of dual-band clients connected to the AP 200 is greater than the threshold DBCLTH. If the determination at 1604 is negative the method 1600 returns to 1602. If the determination at 1604 is positive, the method 1600 at 1606 determines whether the number of neighboring access points is greater than a neighboring AP threshold NAPTH. If the determination at 1606 is negative the method 1600 returns to 1602 and if the determination is positive at 1608 the method turns OFF or deactivates the 2.4 GHz transceivers of the AP 200 to lower the power consumption of the AP.

The justification for this adaptive control of the operating configuration of the AP 200 is that if there are 2.4 GHz client devices connected to the AP 200 but most of these client devices are dual-band client devices capable of also connecting through the 5 GHz frequency band then the 2.4 GHz transceivers of the AP may be deactivated. In this situation, the single-band 2.4 GHz client devices previously connected to the AP 200 may connect to one of the neighboring APs. At 1610, the method 1600 determines whether the number of single-band 2.4 GHz client devices detected by the AP 200 and having an RSSI greater than a threshold RSSITH exceeds a total client devices threshold TCLTH. This determination at 1610 indicates whether there are a significant number of single-band 2.4 GHz client devices proximate the AP 200 to warrant activating the 2.4 GHz transceivers of the AP. When the determination at 1610 is negative the method 1600 returns to 1602. When the determination at 1610 is positive, the method 1600 at 1612 turns ON or activates the 2.4 GHz transceivers of the AP 200.

Figure 17:
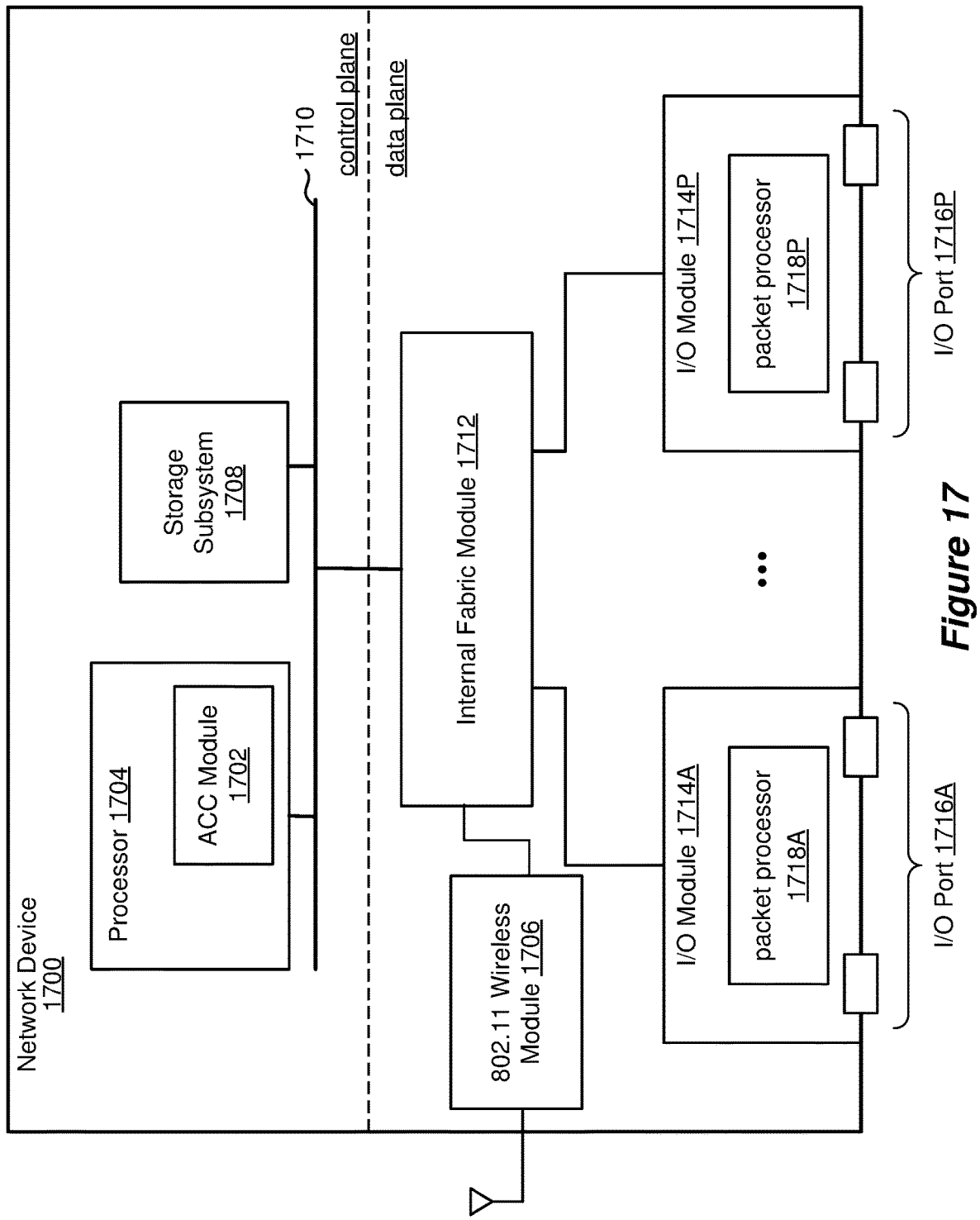
FIG. 17 is a functional block diagram of a network device including an ACC module that controls or adapts the operating configuration of the network device according to embodiments of the present disclosure.

FIG. 17 illustrates a network device 1700 including an adaptive configuration control (ACC) module 1702 according to one or more embodiments of the present disclosure. The network device 1700 may be a network device other than a wireless AP, such as a switch or a router, for example. The ACC module 1702 executes on a processor 1704 and operates to adaptively control components of an 802.11 wireless module 1706 and other components in the network device 1700 when the network device 1700 is operating in a reduce-capabilities (RC) mode due limited power being supplied to the network device. The processor 1704 may be a general-purpose processor, such as an Intel®/AMD® x86-64 or ARM® processor, that operates under the control of software stored in memory or storage subsystem 1708, which may include read-only memory, random access memory, a non-transitory storage medium, or other suitable types of data storage. The processor 1704 communicates over a bus 1710 with the storage subsystem 1708, which stores encoded instructions that cause the processor and ACC module 1702 to perform operations described herein for adaptively controlling the network device 1700 during operation in the RC mode. The processor 1704 may also include encoded logic or hardwired logic for controlling operation of the network device 1700. The processor 1704, ACC module 1702 and storage subsystem 1708 are contained in a control plane, which may also be referred to as a control layer, of the network device 1700, and operate to manage and control operation of the network device 1700 in accordance with embodiments of the present disclosure. The control plane refers to all the functions and processes that determine which path to use in communicating network packets through the network device 1700, such as routing protocols, spanning trees, and the like.

The network device 1700 further includes an internal fabric module 1712 and a number of input/output (I/O) modules 1714A-1714P, each I/O module including one or more I/O ports 1716A-1716P that are used by network device 1700 to send and receive network packets. The internal fabric module 1712 and I/O modules 1714A-1714P collectively represent the data plane of the network device 1700, which may also be referred to as a data layer or forwarding plane. The internal fabric module 1712 functions to interconnect the various I/O modules 1714A-1714P of the network device 1700. Each I/O module 1714A-1714P may also include a packet processor 1718A-1718P, with each packet processor including a forwarding hardware component configured to make wire speed decisions on how to handle incoming (ingress) and outgoing (egress) network packets. In some embodiments, the forwarding hardware can comprise an application specific integrated circuit (ASIC), a field programmable array (FPGA), a digital processing unit, or other such collection of configured logic. The 802.11 wireless module 1706 communicates packets with client devices (not shown) wirelessly connected to the network device 1700. The internal fabric module 1712 is coupled to the 802.11 wireless module 1706 to provide data to be transmitted to client devices and to receive incoming data from client devices.

FURTHER EXAMPLES

In various embodiments, the present disclosure includes systems, methods, and apparatuses for adaptively controlling an operating configuration of a wireless access point or other network device.

Some embodiments provide a method of controlling an operating configuration of a wireless access point. The method comprises detecting power supplied to the wireless access point. The method further comprises determining one or more of an operating parameter of the wireless access point, an operating parameter of a neighboring access point of the wireless access point, and an operating parameter of a client device wirelessly connected to the wireless access point. The method further comprises setting the wireless access point to a reduced-capability operating configuration in response to detecting the power supplied being less than a power threshold, the reduced-capability operating configuration based on the one or more determined operating parameters of the wireless access point, the neighboring access point, and the client device.

In some embodiments of the method, the one or more determined operating parameters of the wireless access point, the neighboring access point, and the client device are periodically determined to update the reduced-capability operating configuration of the access point.

In some embodiments of the method, detecting power supplied to the wireless access point includes determining whether the power supplied is less than the power threshold for a step-down time threshold.

In some embodiments of the method, the operating parameter of the wireless access point comprises a transmit power, a number of active transmit/receive chains, channel utilization, a size of data queued in a transmit buffer, an error rate of a wired interface, a single-user multiple-input and multiple-output (SU-MIMO) capability indicator, and a multi-user multiple-input and multiple-output (MU-MIMO) capability indicator, Bluetooth clients indicator, a universal serial bus (USB) indicator, or a number of client devices connected to the access point.

In some embodiments of the method, the operating parameter of the neighboring access points comprise a number of neighboring access points.

In some embodiments of the method, the operating parameters of the client device comprises a received signal strength indicator, a size of data stored in client device transmit buffers, a dual-band capabilities indicator, a number of active transmit/receive chains indicator, a single-user multiple-input and multiple-output (SU-MIMO) capability indicator, or a multi-user multiple-input and multiple-output (MU-MIMO) capability indicator.

In some embodiments the method further comprises detecting whether the power supplied to the wireless access point is greater than the power threshold and setting the wireless access point to a full-capability operating configuration in response to detecting the power supplied is greater than the power threshold.

In some embodiments of the method, detecting whether the power supplied to the wireless access point is greater than the power threshold comprises detecting whether the power supplied to the wireless access point is greater than the power threshold for a step-up time threshold.

In some embodiments of the method, the reduced-capability operating configuration reduces a power consumption of the wireless access point relative to a power consumption of the wireless access point in the full-capability operating configuration and also maintains coverage and throughput requirements of the client device at this reduced power consumption of the access point.

In some embodiments of the method, detecting power supplied to the wireless access point comprises detecting one of a plurality of different Power over Ethernet (PoE) power levels.

Some embodiments provide a non-transitory computer readable medium encoding instructions that, as a result of execution by an adaptive configuration control module of a wireless access point, cause the adaptive configuration control module to detect power supplied to the wireless access point. The instructions further cause the adaptive configuration module to determine one or more of an operating parameter of the wireless access point, an operating parameter of a neighboring access point of the wireless access point, and an operating parameter of a client device wirelessly connected to the wireless access point. The instructions further cause the adaptive configuration module to set the wireless access point to a reduced-capability operating configuration in response to detecting the power supplied being less than a power threshold, the reduced-capability operating configuration based on the one or more determined operating parameters of the wireless access point, the neighboring access point, and the client device.

In some embodiments of the non-transitory computer readable medium, the non-transitory computer readable medium further encodes instructions that, as a result of execution by the adaptive configuration control module, cause the adaptive configuration control module to periodically determine the one or more determined operating parameters of the wireless access point, the neighboring access point, and the client device to update the reduced-capability operating configuration of the access point.

In some embodiments of the non-transitory computer readable medium, the detection of the power supplied to the wireless access point includes a determination of whether the power supplied is less than the power threshold for a step-down time threshold.

In some embodiments of the non-transitory computer readable medium, the operating parameter of the wireless access point comprises a transmit power, a number of active transmit/receive chains, channel utilization, a size of data queued in a transmit buffer, an error rate of a wired interface, a single-user multiple-input and multiple-output (SU-MIMO) capability indicator, and a multi-user multiple-input and multiple-output (MU-MIMO) capability indicator, Bluetooth clients indicator, a universal serial bus (USB) indicator, or a number of client devices connected to the access point.

In some embodiments of the non-transitory computer readable medium, the operating parameter of the neighboring access points comprise a number of neighboring access points.

In some embodiments of the non-transitory computer readable medium, the operating parameters of the client device comprises a received signal strength indicator, a size of data stored in client device transmit buffers, a dual-band capabilities indicator, a number of active transmit/receive chains indicator, a single-user multiple-input and multiple-output (SU-MIMO) capability indicator, or a multi-user multiple-input and multiple-output (MU-MIMO) capability indicator.

Some embodiments provide a wireless access point, comprising a wireless transceiver and an adaptive configuration control module. The adaptive configuration control module is configured to detect power supplied to the wireless access point. The adaptive configuration control module is further configured to determine one or more of an operating parameter of the wireless access point, an operating parameter of a neighboring access point of the wireless access point, and an operating parameter of a client device wirelessly connected to the wireless access point. The adaptive configuration control module is further configured to set the wireless access point to a reduced-capability operating configuration in response to detecting the power supplied being less than a power threshold, the reduced-capability operating configuration based on the one or more determined operating parameters of the wireless access point, the neighboring access point, and the client device.

In some embodiments of the wireless access point, the adaptive configuration control module adaptively controls the reduced-capability operating configuration over time to reduce power consumption of the wireless access point during operation in the reduce-capability operating configuration.

In some embodiments of the wireless access point, the adaptive configuration control module further adaptively controls the reduced-capability operating configuration over time to maintain capacity and performance of client devices wirelessly connected to the wireless access point.

In some embodiments of the wireless access point, the wireless transceiver has a transmit power and includes a plurality of transmit chains and receive chains, and wherein the adaptive configuration control module controls the transmit power of the wireless transceiver and a number of active transmit chains and receive chains in the wireless transceiver. The foregoing description illustrates various embodiments of the present disclosure along with examples of how aspects of the present disclosure may be implemented. The above examples and embodiments should not be deemed to be the only embodiments and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method of controlling an operating configuration of a wireless access point, the method comprising:
    setting the wireless access point to operate in a full-capability operating configuration comprising a plurality of features;
    detecting power supplied to the wireless access point;
    determining one or more of an operating parameter of the wireless access point, an operating parameter of a neighboring access point of the wireless access point, and an operating parameter of a client device wirelessly connected to the wireless access point;
    dynamically determining a subset of the plurality of features for a reduced-capability operating configuration in response to detecting the power supplied to the wireless access point is less than a power threshold based on the one or more determined operating parameters of the wireless access point, the neighboring access point, and the client device; and
    setting the wireless access point to operate in the dynamically determined reduced-capability operating configuration.

2. The method of claim 1, wherein the one or more determined operating parameters of the wireless access point, the neighboring access point, and the client device are periodically determined to update the reduced-capability operating configuration of the access point.

3. The method of claim 1, wherein detecting the power supplied to the wireless access point includes determining whether the power supplied is less than the power threshold for a step-down time threshold.

4. The method of claim 1, wherein the operating parameter of the wireless access point comprises a transmit power, a number of active transmit/receive chains, channel utilization, a size of data queued in a transmit buffer, an error rate of a wired interface, a single-user multiple-input and multiple-output (SU-MIMO) capability indicator, and a multi-user multiple-input and multiple-output (MU-MIMO) capability indicator, Bluetooth clients indicator, a universal serial bus (USB) indicator, or a number of client devices connected to the access point.

5. The method of claim 1, wherein the operating parameter of the neighboring access points comprise a number of neighboring access points.

6. The method of claim 1, wherein the operating parameters of the client device comprises a received signal strength indicator, a size of data stored in client device transmit buffers, a dual-band capabilities indicator, a number of active transmit/receive chains indicator, a single-user multiple-input and multiple-output (SU-MIMO) capability indicator, or a multi-user multiple-input and multiple-output (MU-MIMO) capability indicator.

7. The method of claim 1 further comprising:
   detecting whether the power supplied to the wireless access point is greater than the power threshold; and
   setting the wireless access point to the full-capability operating configuration in response to detecting the power supplied is greater than the power threshold.

8. The method of claim 7, wherein detecting whether the power supplied to the wireless access point is greater than the power threshold comprises detecting whether the power supplied to the wireless access point is greater than the power threshold for a step-up time threshold.

9. The method of claim 7, wherein the reduced-capability operating configuration reduces a power consumption of the wireless access point relative to a power consumption of the wireless access point in the full-capability operating configuration and also maintains coverage and throughput requirements of the client device at this reduced power consumption of the access point.

10. The method of claim 1, wherein detecting the power supplied to the wireless access point comprises detecting one of a plurality of different Power over Ethernet (PoE) power levels.

11. A non-transitory computer readable medium encoding instructions that, as a result of execution by an adaptive configuration control module of a wireless access point, cause the adaptive configuration control module to:
   set the wireless access point to operate in a full-capability operating configuration comprising a plurality of features;
   detect power supplied to the wireless access point;
   determine one or more of an operating parameter of the wireless access point, an operating parameter of a neighboring access point of the wireless access point, and an operating parameter of a client device wirelessly connected to the wireless access point;
   dynamically determine a subset of the plurality of features for a reduced-capability operating configuration in response to detecting the power supplied to the wireless access point is less than a power threshold based on the one or more determined operating parameters of the wireless access point, the neighboring access point, and the client device; and
   set the wireless access point to the dynamically determined reduced-capability operating configuration.

12. The non-transitory computer readable medium of claim 11, wherein the non-transitory computer readable medium further encodes instructions that, as a result of execution by the adaptive configuration control module, cause the adaptive configuration control module to periodically determine the one or more determined operating parameters of the wireless access point, the neighboring access point, and the client device to update the reduced-capability operating configuration of the access point.

13. The non-transitory computer readable medium of claim 11, wherein the detection of the power supplied to the wireless access point includes a determination of whether the power supplied is less than the power threshold for a step-down time threshold.

14. The non-transitory computer readable medium of claim 11, wherein the operating parameter of the wireless access point comprises a transmit power, a number of active transmit/receive chains, channel utilization, a size of data queued in a transmit buffer, an error rate of a wired interface, a single-user multiple-input and multiple-output (SU-MIMO) capability indicator, and a multi-user multiple-input and multiple-output (MU-MIMO) capability indicator, Bluetooth clients indicator, a universal serial bus (USB) indicator, or a number of client devices connected to the access point.

15. The non-transitory computer readable medium of claim 11, wherein the operating parameter of the neighboring access points comprise a number of neighboring access points.

16. The non-transitory computer readable medium of claim 11, wherein the operating parameters of the client device comprises a received signal strength indicator, a size of data stored in client device transmit buffers, a dual-band capabilities indicator, a number of active transmit/receive chains indicator, a single-user multiple-input and multiple-output (SU-MIMO) capability indicator, or a multi-user multiple-input and multiple-output (MU-MIMO) capability indicator.

17. A wireless access point, comprising:
   a wireless transceiver; and
   an adaptive configuration control module, the adaptive configuration control module configured to:
   set the wireless access point to operate in a full-capability operating configuration comprising a plurality of features:
   detect power supplied to the wireless access point;
   determine one or more of an operating parameter of the wireless access point, an operating parameter of a neighboring access point of the wireless access point, and an operating parameter of a client device wirelessly connected to the wireless access point;
   dynamically determine a subset of the plurality of features a reduced-capability operating configuration in response to detecting the power supplied to the wireless access point is less than a power threshold based on the one or more determined operating parameters of the wireless access point, the neighboring access point, and the client device; and
   set the wireless access point to the dynamically determined reduced-capability operating configuration.

18. The wireless access point of claim 17, wherein the adaptive configuration control module adaptively controls the reduced-capability operating configuration over time to reduce power consumption of the wireless access point during operation in the reduce-capability operating configuration.

19. The wireless access point of claim 18, wherein the adaptive configuration control module further adaptively controls the reduced-capability operating configuration over time to maintain capacity and performance of client devices wirelessly connected to the wireless access point.

20. The wireless access point of claim 17, wherein the wireless transceiver has a transmit power and includes a plurality of transmit chains and receive chains, and wherein the adaptive configuration control module controls the transmit power of the wireless transceiver and a number of active transmit chains and receive chains in the wireless transceiver.

\* \* \* \* \*